(12) United States Patent
Reed

(10) Patent No.: US 8,541,950 B2
(45) Date of Patent: Sep. 24, 2013

(54) APPARATUS AND METHOD OF ENERGY EFFICIENT ILLUMINATION

(75) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 601 days.

(21) Appl. No.: 12/784,091

(22) Filed: May 20, 2010

(65) Prior Publication Data

US 2010/0295454 A1    Nov. 25, 2010

Related U.S. Application Data

(60) Provisional application No. 61/180,017, filed on May 20, 2009, provisional application No. 61/333,983, filed on May 12, 2010, provisional application No. 61/346,263, filed on May 19, 2010.

(51) Int. Cl.
*H05B 37/02* (2006.01)
*H05B 39/04* (2006.01)
*H05B 41/36* (2006.01)
*F21V 23/04* (2006.01)

(52) U.S. Cl.
USPC .......................................... 315/152; 362/276

(58) Field of Classification Search
None
See application file for complete search history.

(56) References Cited

U.S. PATENT DOCUMENTS

| | | | |
|---|---|---|---|
| 4,153,927 A | 5/1979 | Owens | |
| 4,237,377 A | 12/1980 | Sansum | |
| 5,086,379 A | 2/1992 | Denison et al. | |
| 5,160,202 A | 11/1992 | Légaré | 362/153.1 |
| 5,230,556 A | 7/1993 | Canty et al. | |
| 5,276,385 A * | 1/1994 | Itoh et al. | 315/73 |
| 5,343,121 A | 8/1994 | Terman et al. | 315/158 |
| 5,349,505 A | 9/1994 | Poppenheimer | |
| 5,450,302 A * | 9/1995 | Maase et al. | 362/276 |
| 5,589,741 A | 12/1996 | Terman et al. | 315/360 |
| 6,111,739 A | 8/2000 | Wu et al. | 361/106 |
| 6,612,720 B1 | 9/2003 | Beadle | |
| 6,753,842 B1 | 6/2004 | Williams et al. | |

(Continued)

FOREIGN PATENT DOCUMENTS

| DE | 40 01 980 | 8/1990 |
|---|---|---|
| EP | 1 734 795 | 12/2006 |

(Continued)

OTHER PUBLICATIONS

Reed et al., "Low-Profile Pathway Illumination System," U.S. Appl. No. 61/051,619, filed May 8, 2008, 25 pages.

(Continued)

*Primary Examiner* — Douglas W Owens
*Assistant Examiner* — Dedei K Hammond
(74) *Attorney, Agent, or Firm* — Seed IP Law Group PLLC

(57) ABSTRACT

An illumination system reduces a level of light output, and hence power consumption, at a time after turning ON a light source, and increases the level of light output at a time prior to turning OFF the light source. A control subsystem can determine when to increase the level of light based on a predicted time when the light source will be turned OFF. The control subsystem may determine an average or median length of time that the light source has been turned on for a number of recent daily cycles. A control subsystem may be an integral part of a luminaire or may be a retrofit.

26 Claims, 9 Drawing Sheets

(56) References Cited

U.S. PATENT DOCUMENTS

| | | | |
|---|---|---|---|
| 6,902,292 B2 | 6/2005 | Lai | |
| 7,066,622 B2 | 6/2006 | Alessio | |
| 7,122,976 B1 | 10/2006 | Null et al. | 315/362 |
| 7,188,967 B2 | 3/2007 | Dalton et al. | |
| 7,239,087 B2 | 7/2007 | Ball | 315/128 |
| 7,281,820 B2 | 10/2007 | Bayat et al. | |
| 7,317,403 B2 | 1/2008 | Grootes et al. | 340/815.45 |
| 7,339,323 B2 | 3/2008 | Bucur | 315/128 |
| 7,339,471 B1 * | 3/2008 | Chan et al. | 340/541 |
| 7,405,524 B2 | 7/2008 | Null et al. | |
| 7,578,596 B2 | 8/2009 | Martin | |
| 7,688,222 B2 | 3/2010 | Peddie et al. | |
| 7,703,951 B2 | 4/2010 | Piepgras et al. | |
| 7,804,200 B2 | 9/2010 | Flaherty | |
| 7,834,922 B2 | 11/2010 | Kurane | |
| 7,940,191 B2 | 5/2011 | Hierzer | |
| 2002/0113192 A1 | 8/2002 | Antila | |
| 2004/0095772 A1 | 5/2004 | Hoover et al. | 362/363 |
| 2004/0105264 A1 | 6/2004 | Spero | 362/276 |
| 2004/0120148 A1 | 6/2004 | Morris et al. | 362/264 |
| 2004/0201992 A1 | 10/2004 | Dalton et al. | |
| 2005/0099802 A1 | 5/2005 | Lai | |
| 2005/0135101 A1 | 6/2005 | Richmond | 362/276 |
| 2005/0174780 A1 | 8/2005 | Park | 362/294 |
| 2005/0243022 A1 | 11/2005 | Negru | 345/46 |
| 2005/0254013 A1 | 11/2005 | Engle et al. | 353/52 |
| 2006/0001384 A1 | 1/2006 | Tain et al. | 315/246 |
| 2006/0014118 A1 | 1/2006 | Utama | 433/31 |
| 2006/0034075 A1 | 2/2006 | Alessio | |
| 2006/0053459 A1 | 3/2006 | Simerly et al. | |
| 2006/0158130 A1 | 7/2006 | Furukawa | 315/200 R |
| 2006/0202914 A1 | 9/2006 | Ashdown | 345/46 |
| 2006/0262544 A1 | 11/2006 | Piepgras et al. | |
| 2006/0277823 A1 | 12/2006 | Barnett et al. | 47/33 |
| 2007/0096118 A1 | 5/2007 | Mahalingam et al. | 257/81 |
| 2007/0102033 A1 | 5/2007 | Petrocy | 136/203 |
| 2007/0159819 A1 | 7/2007 | Bayat et al. | |
| 2007/0247853 A1 | 10/2007 | Dorogi | 362/294 |
| 2007/0279921 A1 | 12/2007 | Alexander et al. | 362/368 |
| 2008/0043106 A1 | 2/2008 | Hassapis et al. | |
| 2008/0130304 A1 | 6/2008 | Rash et al. | |
| 2008/0266839 A1 | 10/2008 | Claypool et al. | |
| 2008/0271065 A1 | 10/2008 | Buonasera et al. | 725/10 |
| 2008/0291661 A1 | 11/2008 | Martin | |
| 2009/0161356 A1 | 6/2009 | Negley et al. | |
| 2009/0278474 A1 | 11/2009 | Reed et al. | 315/294 |
| 2009/0278479 A1 | 11/2009 | Platner et al. | |
| 2009/0284155 A1 | 11/2009 | Reed et al. | |
| 2010/0060130 A1 | 3/2010 | Li | 313/46 |
| 2010/0090577 A1 | 4/2010 | Reed et al. | 313/46 |
| 2010/0123403 A1 | 5/2010 | Reed | 315/193 |
| 2010/0277082 A1 | 11/2010 | Reed et al. | 315/159 |
| 2010/0295455 A1 | 11/2010 | Reed | 315/152 |
| 2010/0295946 A1 | 11/2010 | Reed et al. | 348/164 |
| 2011/0001626 A1 | 1/2011 | Yip et al. | |
| 2011/0026264 A1 | 2/2011 | Reed et al. | |
| 2011/0175518 A1 | 7/2011 | Reed et al. | |
| 2011/0310605 A1 | 12/2011 | Renn et al. | |

FOREIGN PATENT DOCUMENTS

| | | |
|---|---|---|
| FR | 2 883 306 | 9/2006 |
| JP | 2001-333420 | 11/2001 |
| JP | 2004/349065 | 12/2004 |
| JP | 2006/244711 | 9/2006 |
| WO | 02/076068 | 9/2002 |
| WO | 03/056882 | 7/2003 |
| WO | 2006/057866 | 6/2006 |
| WO | 2007/036873 | 4/2007 |
| WO | 2008/030450 | 3/2008 |
| WO | 2009/040703 | 4/2009 |

OTHER PUBLICATIONS

Reed et al., "Gas-Discharge Lamp Replacement," U.S. Appl. No. 61/052,924, filed May 13, 2008, 32 pages.

Reed et al., "Turbulent Flow Cooling for Electronic Ballast," U.S. Appl. No. 61/088,651, filed Aug. 13, 2008, 23 pages.

Reed, "Electronic Control to Regulate Power for Solid-State Lighting and Methods Thereof," U.S. Appl. No. 61/115,438, filed Nov. 17, 2008, 51 pages.

Reed, "Electronic Control to Regulate Power for Solid-State Lighting and Methods Thereof," U.S. Appl. No. 61/154,619, filed Feb. 23, 2009, 62 pages.

Reed et al., "Gas-Discharge Lamp Replacement with Passive Cooling," U.S. Appl. No. 61/174,913, filed May 1, 2009, 29 pages.

Reed et al., "Long-Range Motion Detection for Illumination Control," U.S. Appl. No. 61/180,017, filed May 20, 2009, 32 pages.

Reed et al., "Electrically Isolated Heat Sink for Solid-State Light," U.S. Appl. No. 61/229,435, filed Jul. 29, 2009, 29 pages.

Reed et al., "Apparatus, Method to Change Light Source Color Temperature with Reduced Optical Filtering Losses," U.S. Appl. No. 61/295,519, filed Jan. 15, 2010, 35 pages.

Reed, "Apparatus and Method of Energy Efficient Illumination," U.S. Appl. No. 61/333,983, filed May 12, 2010, 57 pages.

Reed, "Apparatus and Method of Energy Efficient Illumination," U.S. Appl. No. 61/346,263, filed May 19, 2010, 67 pages.

Renn et al., "Solid State Lighting Device and Method Employing Heat Exchanger Thermally Coupled Circuit Board," U.S. Appl. No. 61/357,421, filed Jun. 22, 2010, 49 pages.

International Search Report, mailed Jul. 9, 2009 for PCT/US2009/043171, 3 pages.

Written Opinion, mailed Jul. 9, 2009 for PCT/US2009/043171, 8 pages.

International Search Report, mailed Jun. 21, 2010 for PCT/US2009/064625, 3 pages.

Written Opinion, mailed Jun. 21, 2010 for PCT/US2009/064625, 5 pages.

International Search Report, mailed Dec. 13, 2010 for PCT/US2010/035649, 3 pages.

Written Opinion, mailed Dec. 13, 2010 for PCT/US2010/035649, 4 pages.

International Search Report, mailed Dec. 28, 2010 for PCT/US2010/035651, 3 pages.

Written Opinion, mailed Dec. 28, 2010 for PCT/US2010/035651, 3 pages.

"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

EE Herald, "Devices to protect High brightness LED from ESD," dated Mar. 16, 2009, retrieved Jun. 10, 2011, retrieved from http://www.eeherald.com/section/new-products/np100779.html, 1 page.

International Search Report, mailed Dec. 15, 2010 for PCT/US2010/035658, 3 pages.

International Search Report, mailed Oct. 8, 2012 for PCT/US2012/033059, 3 pages.

Littelfuse, "Application Note: Protecting LEDs in Product Designs," 2009, 2 pages.

Panasonic Electronic Components, "LED Lighting Solutions," 2009, 6 pages.

Reed et al., "Apparatus and Method for Schedule Based Operation of a Luminaire" U.S. Appl. No. 13/604,327, filed Sep. 5, 2012, 44 pages.

Reed et al., "Apparatus and Method of Operating a Luminaire," U.S. Appl. No. 13/558,191, filed Jul. 25, 2012, 84 pages.

Reed et al., "Apparatus, Method to Enhance Color Contrast in Phosphor-Based Solid State Lights," U.S. Appl. No. 61/534,722, filed Sep. 14, 2011, 53 pages.

Reed et al., "Low-Profile Pathway Illumination System," Office Action, dated May 5, 2011, for U.S. Appl. No. 12/437,472, 24 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," Notice of Allowance, dated Oct. 14, 2011, for U.S. Appl. No. 12/437,472, 9 pages.

Reed et al., "Apparatus, Method to Change Light Source Color Temperature With Reduced Optical Filtering Losses," U.S. Appl. No. 61/406,490, filed Oct. 25, 2010, 46 pages.

Reed, "Apparatus and Method of Energy Efficient Illumination Using Received Signals," U.S. Appl. No. 13/085,301, filed Apr. 12, 2011, 99 pages.

Reed, "Electrostatic Discharge Protection for Luminaire," U.S. Appl. No. 13/212,074, filed Aug. 17, 2011, 30 pages.

Reed, "Resonant Network for Reduction of Flicker Perception in Solid State Lighting Systems," U.S. Appl. No. 61/527,029, filed Aug. 24, 2011, 41 pages.

Reed et al., "Systems and Methods That Employ Object Recognition," U.S. Appl. No. 13/411,321, filed Mar. 2, 2012, 51 pages.

Renesas Electronics, "Zener Diodes for Surge Absorption—Applications of high-intensity LED," Apr. 2010, 1 page.

Tyco Electronics, "Circuit Protection," retrieved Jun. 10, 2011, retrieved from http://www.tycoelectronics.com/en/products/circuit-protection.html, 2 pages.

Written Opinion, mailed Dec. 15, 2010 for PCT/US2010/035658, 3 pages.

Written Opinion, mailed Oct. 8, 2012 for PCT/US2012/033059, 3 pages.

* cited by examiner

APPARATUS AND METHOD OF ENERGY EFFICIENT ILLUMINATION

CROSS-REFERENCE TO RELATED APPLICATIONS

This application claims benefit under 35 U.S.C. 11(e) to U.S. Provisional Patent Application Ser. No. 61/180,017, filed May 20, 2009, U.S. Provisional Patent Application Ser. No. 61/333,983, filed May 12, 2010, and U.S. Provisional Patent Application Ser. No. 61/346,263, filed May 19, 2010.

BACKGROUND

1. Technical Field

The present disclosure generally relates to the field of illumination devices and, more particularly, to control of illumination to improve energy efficiency.

2. Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, florescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with florescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, florescent light sources take a relatively long time after being turned ON to achieve their full rated level of output light or illumination. Such light sources also typically have a high energy consumption during warm-up. Many of higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism.

Automatic control mechanisms generally fall into two broad categories, timers and environmental sensors. Timer based control mechanisms turn light sources ON and OFF based on time. The times are typically user configurable. Such relies on the user to account for changes in length of day light which may occur throughout a year. Very often, timer based control mechanisms are set once and never updated. Environmental sensor based control mechanisms sense light or illumination level and/or motion or proximity. Light or illumination level based control mechanisms are commonly referred to dusk-to-dawn sensors. Dusk-to-dawn light or illumination level based control mechanisms turn the light sources ON when a level of light or illumination in an environment falls below a turn ON threshold, and turn the light sources OFF when the level of light or illumination exceeds a turn OFF threshold. Light or illumination level based control subsystems advantageously automatically accommodate changes in length of day light throughout the year. Motion or proximity based control mechanisms (e.g., passive infrared sensor based) turn light sources ON when motion or proximity is detected. Motion or proximity based control mechanisms turn light sources OFF after some period of time if no motion or proximity is detected during that period of time. Sensitivity of such motion or proximity based control mechanisms is typically user configurable, as is the duration between turn ON and turn OFF. However, motion or proximity based control mechanisms have limited range (e.g., 10 meters), limiting the number of applications in which such may be effectively employed. Motion or proximity based control mechanisms may also be ineffective where the ambient air temperature or temperature of an object is close to that of the trigger temperature (e.g., temperature of human body). Some lighting control mechanisms employ both light or illumination level based and motion or proximity based techniques. Such lighting control mechanisms turn light sources ON only if motion is detected while the level of light or illumination in the environment is below the turn ON threshold. Thus, the motion or proximity sensing is active only between dusk and dawn.

Sometimes these approaches are incompatible with each other. For example, the relatively long time for florescent light sources to produce full output hinders the effective use of such light sources with motion or proximity based control mechanisms. Further, many control mechanisms are built into the luminaire. Such makes it difficult or even impossible to modify operation of the control mechanism beyond some simple user settings (e.g., sensitivity, duration between turn ON and turn OFF).

New approaches to improving the energy efficiency of lighting systems are desirable.

BRIEF SUMMARY

As previously explained, lighting systems which use dusk-to-dawn control mechanisms typically provides light at a continuous, relatively high, level from dusk to dawn. The exception to such appears to be when motion or proximity based sensing is included in such a control mechanism. In many instances, a high level of lighting or illumination is not necessary throughout the entire period. For instance, in retail business or corporate office parking lots high levels of light or illumination are typically only useful into the late evening hours (e.g., 10 PM or 11 PM) and early morning hours (e.g., 4 AM or 5 AM). High level lighting or illumination between the late evening and early morning hours provide little benefit. A lower level of light or illumination during such hours may achieve sufficient illumination for some desired purpose (e.g., security), while reducing energy consumption. Such may useful with a simple dusk-to-dawn control mechanism. Use of a low level lighting or illumination during such hours may also make practical use of relatively slow warm up light sources with motion or proximity based control mechanisms since the illumination sources may only need to be warmed up from an already turned ON, but reduced output state, instead of warming up from an OFF state.

A method of operating an outdoor illumination system may be summarized as including processing by at least one control subsystem information indicative of a level of light or illumination sensed by at least one sensor over a plurality of daily cycles; the processing by the at least one control subsystem including: causing at least one illumination source to be turned ON at a first illumination level during a current one of the daily cycles; causing at least one illumination source to be turned OFF during the current one of the daily cycles; causing a level of illumination produced by the at least one illumination source to be reduced from the first level to a non-zero level between the at least one illumination source being turned ON and OFF during the current one of the daily cycles; determining when to cause the level of illumination produced by the at least one illumination source to be increased, the increase to occur between the causing the level of illumination produced by the at least one illumination source to be reduced from the first level and the at least one illumination source being turned OFF, the determining based at least in part on the sensed level of illumination sensed during at least one previous one of the daily cycles which occurred before the current one of the daily cycles; and causing the level of illumination produced by the at least one illumination source to be increased between the causing the level of illumination produced by the at least one illumination source to be reduced and the at least one illumination source being turned OFF during the current one of the daily cycles. Determining when to cause the level of illumination produced by the at least one illumination source to be increased based at least in part on the sensed level of illumination sensed during at least one previous one of the daily cycles may include determining at least one of an average or a median of a respective amount of time that the at least one illumination source is either ON or OFF over each of a plurality of previous ones of the daily cycles.

Determining when to cause the level of illumination produced by the at least one illumination source to be increased may further include dividing the determined average or mean into three periods, a first period immediately following the turning ON of the at least one illumination source during which the at least one illumination source is operated at a relatively high level of illumination, a second period following the first period during which the at least one illumination source is operated at a relatively low level of illumination, and a third period following the second period and immediately preceding when the at least one illumination source is turned OFF during which the at least one illumination source is operated at a relatively high level of illumination, at least two of the periods being equal to one another. Determining when to cause the level of illumination produced by the at least one illumination source to be increased based at least in part on the sensed level of illumination sensed during at least one previous daily cycle may include determining a time which occurs for a determined period before the at least one illumination source is turned OFF based at least in part on the determined average or the median. Determining when to cause the level of illumination produced by the at least one illumination source to be increased based at least in part on the sensed level of illumination sensed during at least one previous one of the daily cycles may include omitting from the respective amounts of time from which the average or median are determined any amount of time that is substantially shorter than other ones of the amounts of time.

The method may further include determining if any amount of time is substantially shorter than other ones of the amounts of time from which the average or median are determined; setting a flag in response to the determination; causing the at least one illumination source to be turned ON at the first illumination level until turned OFF during a next one of the daily cycles without causing the level of illumination produced by the at least one illumination source to be reduced during the next one of the daily cycles.

The method may further include adjusting the determined period based on at least one user input. Causing at least one illumination source to be turned ON at a first illumination level may include causing the at least one illumination source to be turned ON in response to the sensed illumination level during the current one of the daily cycles being equal to or below a turn ON threshold. Causing the at least one illumination source to be turned OFF may include causing the at least one illumination source to be turned OFF in response to the sensed illumination level during the current one of the daily cycles being equal to or above a turn OFF threshold. Causing the at least one illumination source to be turned OFF may include causing the at least one illumination source to be turned OFF in response to passage of a determined time after the sensed illumination level during the current one of the daily cycles being equal to or below the turn ON threshold.

The method may further include determining a period of time between when the at least one illuminate source is turned ON and turned OFF during at least one of the daily cycles; determining a middle of the determined period; and wherein determining when to cause the level of illumination produced by the at least one illumination source to be increased based at least in part on the sensed level of illumination sensed during at least one previous one of the daily cycles includes calibrating a clock to the determined middle of the determined period. Determining when to cause the level of illumination produced by the at least one illumination source to be increased based at least in part on the sensed level of illumination sensed during at least one previous one of the daily cycles may include determining an amount of delay after occurrence of the middle of the determination period on the calibrated clock based on a total duration of the determined period.

The method may further include during a training daily cycle, determining an amount of time between sensing a level of illumination that is below a turn ON threshold and sensing a level of illumination that is above a turn OFF threshold; and storing information indicative of the determined amount of time in a processor-readable storage medium.

The method may further include repeatedly sensing with the at least one sensor the level of illumination in an environment over the plurality of daily cycles.

A system for outdoor illumination may be summarized as including a control subsystem that includes at least one control circuit, the control subsystem communicatively coupled to receive signals from at least one sensor, the received signals indicative of a level of illumination over a plurality of daily cycles and that: causes at least one illumination source to be turned ON at a first illumination level during a current one of the daily cycles; causes at least one illumination source to be turned OFF during the current one of the daily cycles; causes a level of illumination produced by the at least one illumination source to be reduced from the first level to a non-zero level between the at least one illumination source being turned ON and OFF during the current one of the daily cycles; determines when to cause the level of illumination produced by the at least one illumination source to be increased, the increase to occur between the causing the level of illumination produced by the at least one illumination source to be reduced from the first level and the at least one illumination source being turned OFF, the determining based at least in part on the sensed level of illumination sensed during at least one previous one of the daily cycles which occurred before the current one of the daily cycles; and causes the level of illumination produced by the at least one illumination source to be increased between the causing the level of illumination produced by the at least one illumination source to be reduced and the at least one illumination source being turned OFF during the current one of the daily cycles. The control subsystem may determine at least one of an average or a median of a respective amount of time that the at least one illumination source is either ON or OFF over each of a plurality of previous ones of the daily cycles to determine when to cause the level of illumination produced by the at least one illumination source to be increased. The control subsystem may divide the determined average or mean into two or even three approximately equal periods. For example, the control subsystem may divide the determined average or mean into a first period immediately following the turning ON of the at least one illumination source during which the at least one illumination source is operated at a relatively high level of illumination, a second period following the first period during which the at least one illumination source is operated at a relatively low level of illumination, and a third period following the second period and immediately preceding when the at least one illumination source is turned OFF during which the at least one illumination source is operated at a relatively high level of illumination. The first and third periods may be of equal durations (e.g., 4 hours), while the second period may vary based on the length of nighttime during the year. Alternatively, the first, second and third periods may be of equal lengths to one another. The control subsystem may determine a time which occurs a determined period before the at least one illumination source is turned OFF based at least in part on the determined average or the median to determine when to cause the level of illumination produced by the at least one illumination source to be increased. The control subsystem may omit from the respective amounts of time from which the average or median are determined any amount of time that is substantially shorter than other ones of the amounts of time.

The control subsystem may further adjust the determined period based on at least one user input. The control subsystem may cause the at least one illumination source to be turned ON in response to the sensed illumination level during the current one of the daily cycles being equal to or below a turn ON threshold. The control subsystem may cause the at least one illumination source to be turned OFF in response to the sensed illumination level during the current one of the daily cycles being equal to or above a turn OFF threshold.

The control subsystem may further determine a period of time between when the at least one illuminate source is turned ON and turned OFF during at least one of the daily cycles; may determine a middle of the determined period; may calibrate a clock to the determined middle of the determined period; and may determine when to cause the level of illumination produced by the at least one illumination source to be increased further based at least in part on the calibrated clock. During a training daily cycle the control subsystem may determine an amount of time between sensing a level of illumination that is below a turn ON threshold and sensing a level of illumination that is above a turn OFF threshold; and may store information indicative of the determined amount of time in a processor-readable storage medium. The system may be selectively detachable from a luminaire that includes dawn/dusk control mechanism and at least one light sensitive sensor.

The system may further include at least one sensor that senses illumination in an environment, the at least one sensor communicatively coupled to the control sub.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 6C is a graph showing a level of illumination or output versus time over two daily cycles during the second part of a year, according to another non-limiting illustrated embodiment where a length of time of high intensity illumination varies as a function of total time that the light source ON.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires and imaging devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms lighting and illumination are used herein interchangeably. For instance, the phrases "level of illumination" or "level of light output" have the same meanings. Also instance, the phrases "illumination source" and "light source" have the same meanings.

The headings and Abstract of the Disclosure provided herein are for convenience only and do not interpret the scope or meaning of the embodiments.

Figure 1:
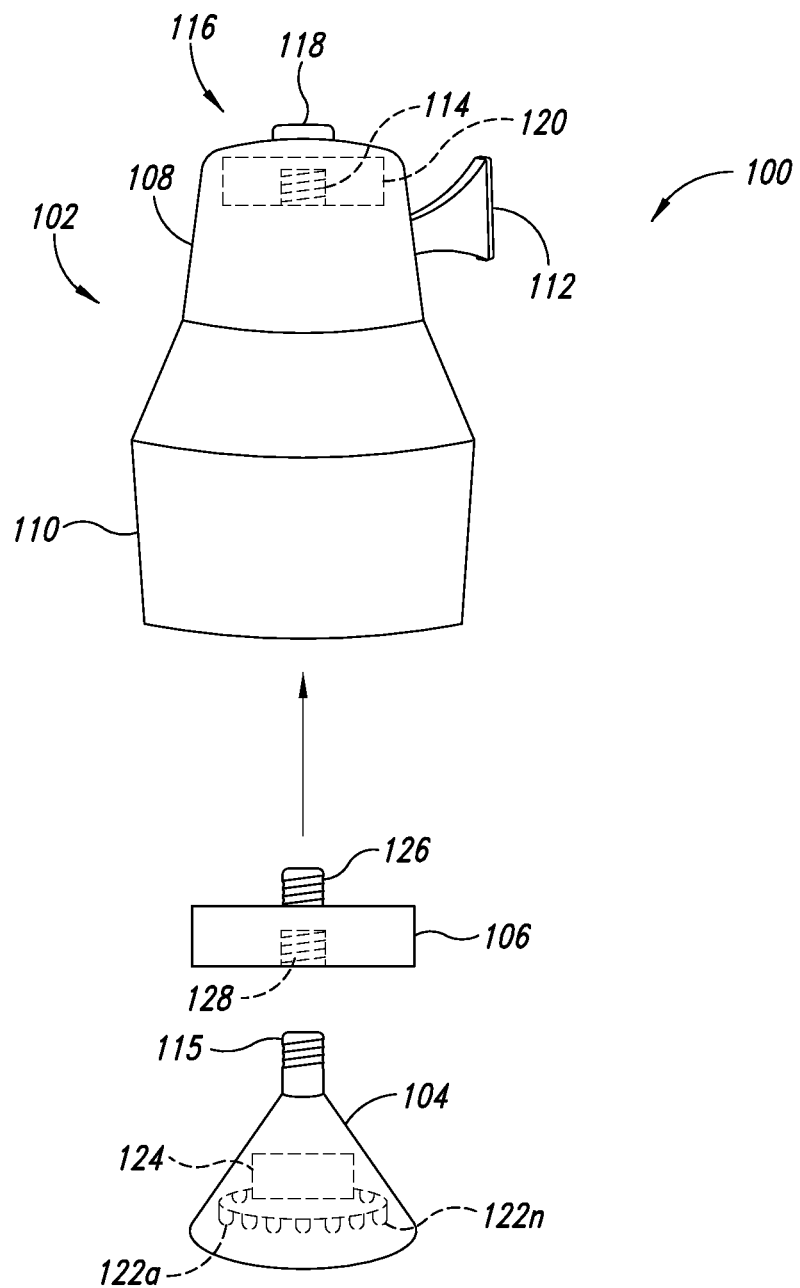
FIG. 1 is a partially exploded isometric diagram showing a conventional luminaire, light source and a retrofit control subsystem selectively attachable between the luminaire and light source, according to one non-limiting illustrated embodiment.

FIG. 1 shows an illumination system 100 according to one non-limiting illustrated embodiment. The illumination system 100 includes a conventional luminaire 102, at least one illumination or light source 104, and a retrofit control subsystem 106.

The luminaire 102 may take any of a variety of forms. For example, the luminaire 102 may include a housing 108, a shade 110 and optionally a bracket 112 to allow the luminaire 102 to be hung from a structure. The shade 110 may be transparent or translucent or may be opaque. The luminaire 102 may include a socket, for instance a threaded socket or receptacle 114, sized to removably or interchangeably receive a base 115 of the light source 104 and wiring (not called out) to provide power to the light source 104 from an external source of electrical power. As previously noted, such luminaires 102 are conventional and commercially available from a large variety of sources.

The luminaire 102 may include a built-in or integral dusk-to-dawn control mechanism 116. The dusk-to-dawn control mechanism 116 includes at least one sensor 118 (e.g., photosensor, cadmium sulfide cell, photodiode, phototransistor, ambient light sensor integrated circuit) that is responsive to a level (e.g., energy or intensity) of light or illumination in the environment (e.g., daylight or ambient light) and at least one control circuit 120. The sensor 118 may be positioned to minimize an effect of the light source 104 on the sensor 118. For example, the sensor 118 may be positioned on top of the housing 108. Typically, the control circuit 120 is configured to turn the light source 104 ON when a level of light detected by the sensor 118 is below a turn ON threshold and to turn the light source 104 OFF when the level of light detected by the sensor 118 is above a turn OFF threshold. The turn ON and turn OFF thresholds may, or may not, be equal to one another.

The light source 104 may take a variety of forms. The light source may include one or more distinct light bulbs, lights or light emitters 122a-122n (only two called out in FIG. 1). For example, the light source 104 may take the form of one or more incandescent light bulbs. Also for example, the light source 104 may take the form of one or more florescent light bulbs such as HID light bulbs or lights, one or more arc lamps, or one or more gas-discharge lamps. Advantageously, the light source 104 may take the form of one or more solid state light sources, for instance an array of LEDs, OLEDs or PLEDs. While illustrated as a blub, the light sources do not necessarily have to be enclosed in a blub structure. For example, the light sources may take the form of one-, two-, or even three-dimensional arrays of individual LEDs or strings of LEDs. Where appropriate, the light source 104 may also include a ballast 124.

The retrofit control subsystem 106 is selectively attachable or coupleable between the luminaire 102 and the light source 104 to provide an interface therebetween. In particular, the retrofit control subsystem 106 includes a base 126 sized to be received in the socket or receptacle 114 of the luminaire 102. Typically, the base 126 will have a thread which allows the base 126 to be threadedly removably or detachably received by the socket or receptacle 114 of the luminaire 102. The socket 114 and base 114 provide both physical and electrical coupling between the luminaire 102 and the retrofit control system 106. The retrofit control subsystem 106 also includes a socket or receptacle 128 sized to receive the base 115 of the light source 104. Typically, the socket or receptacle 128 has a thread which allows the base of the light source 104 to be threadedly removably or detachably received by the socket or receptacle 128. The socket 128 and base 115 provide both physical and electrical coupling between the retrofit control subsystem 106 and the light source 104.

The retrofit control subsystem 106 also includes electrical circuitry or electronics that adjusts an illumination level downward at a time after the light source is turned ON and adjusts the illumination level upward at a time preceding the light source being turned OFF. Such provides lighting at relatively high levels when illumination is typically most useful, while providing lighting at reduced levels when illumination is not typically useful, thereby reducing energy usage. Such is possible via a retrofit to existing luminaires. Such may avoid the drawbacks associated with motion or proximity based control, such as the limited range of motion or proximity sensors and lack of sensitivity of such sensors in warm climates. As described in more detail below, the retrofit control subsystem 106 may monitor the hours in which the light source 104 is ON or needed, and advantageously employ such in controlling the light source 104. Such can automatically accommodate seasonal changes in the length of daylight or night.

Figure 2:
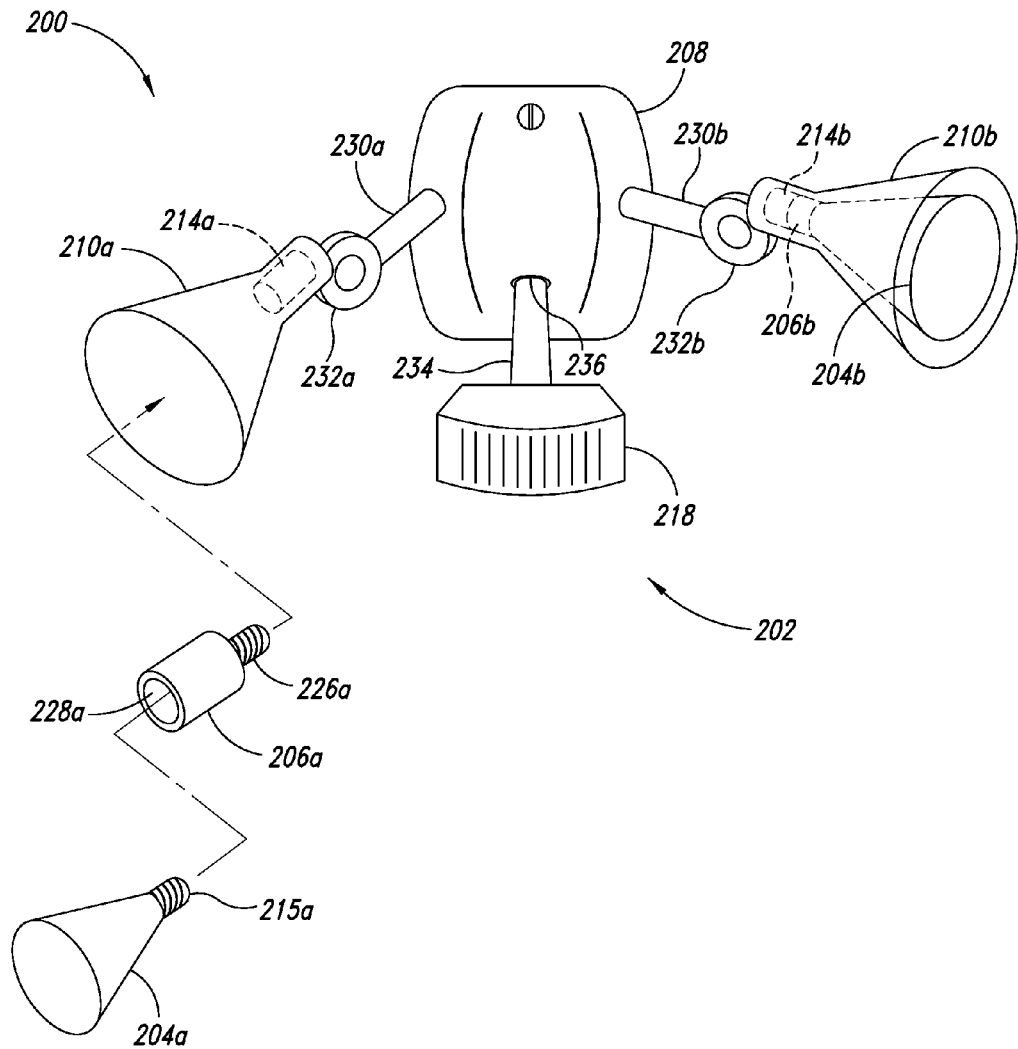
FIG. 2 is a partially exploded isometric diagram showing a conventional luminaire, conventional light sources and a retrofit control subsystem selectively attachable between the luminaire and light source, according to another non-limiting illustrated embodiment.

FIG. 2 shows an illumination system 200 according to another non-limiting illustrated embodiment. The illumination system 200 includes a conventional luminaire 202, illumination or light sources 204a, 204b, and retrofit control subsystems 206a, 206b (only one visible in FIG. 2).

The luminaire 202 may take any of a variety of forms. For example, the luminaire 202 may include a housing 208, two shades 210a, 210b, and at least one optical sensor 218. The housing 208 allows the luminaire 202 to be hung from a structure. The shades 210a, 210b each include a respective socket or receptacle 214a, 214b sized to receive a base 215a (only one visible in FIG. 2) of the light source 204a, 204b. The shades 210a, 210b may be supported from the housing 208 by respective articulated arms 230a, 230b. The arms 230a, 230b may include one or more joints 232a, 232b to provide multiple degrees of freedom which allows the shades 210a, 210b and respective light sources 204a, 204b to be positioned and oriented in any desired manner. The optical sensor 218 may be supported from the housing 208 by an arm 234, for example via a ball joint 236. Such may allow the optical sensor 218 to be positioned and oriented with respect to the housing 208 and any structure to which the housing is mounted. As previously noted, such luminaires 202 are conventional and commercially available from a large variety of sources.

Luminaires 202 of this type typically have a control mechanism that implements both dusk-to-dawn and motion or proximity based control. Thus, the control mechanism relies on signals from the optical sensor to implement motion or proximity sensing only during a period after a level of light or illumination in the environment has fallen below a turn ON threshold (e.g., 10 Lux) and before the level of illuminations exceeds a turn OFF threshold (e.g., 30 Lux). The control mechanism will turn the light sources 204a, 204b ON for a period of time in response to the detection of motion between dusk and dawn, turning the light sources 204a, 204b OFF after the period of time.

Respective retrofit control subsystems 206a, 206b are selectively attachable or coupleable between the sockets or receptacles 214a, 214b of the luminaire 202 and the bases 215a of the light sources 204a, 204b to provide an interface therebetween. In particular, the retrofit control subsystems 206a, 206b include a base 226a (only one visible in FIG. 2) sized to be received in the sockets or receptacles 214a, 214b of the luminaire 202. Typically, the base 226a will have a thread which allows the base 226a to be threadedly removably or detachably received by the socket or receptacle 214a, 241b of the luminaire 202. The socket 214a, 214b and base 214a provide both physical and electrical coupling between the luminaire 202 and the respective retrofit control system 206a, 206b. The retrofit control subsystems 206a, 206b also include a socket or receptacle 228a (only one visible in FIG. 2) sized to receive the base 215a of the light source 204a, 204b. Typically, the socket or receptacle 228a has a thread which allows the base 215a of the light source 204 to be threadedly removably or detachably received by the socket or receptacle 228a. The socket 228a and base 215a provide both physical and electrical coupling between the retrofit control subsystem 206a, 206b and the respective light source 204a, 204b.

As discussed above, the retrofit control subsystems 206a, 206b include electrical circuitry or electronics that adjust an illumination level downward at a time after the light source is turned ON and adjust the illumination level upward at a time preceding the light source being turned OFF. Such provides lighting at relatively high levels when illumination is typically most useful, while providing lighting a reduced levels when illumination is not typically useful, thereby reducing energy usage. Such is possible via a retrofit to existing luminaires. Such may avoid the drawbacks associated with motion or proximity based control, such as the limited range of motion or proximity sensors and lack of sensitivity of such sensors in warm climates. As described in more detail below, the retrofit control subsystem 206a, 206b may monitor the hours in which the light source 204a, 204b is ON or needed, and advantageously employ such in controlling the light source 204a, 204b. Such can automatically accommodate seasonal changes in the length of daylight or night.

Figure 3:
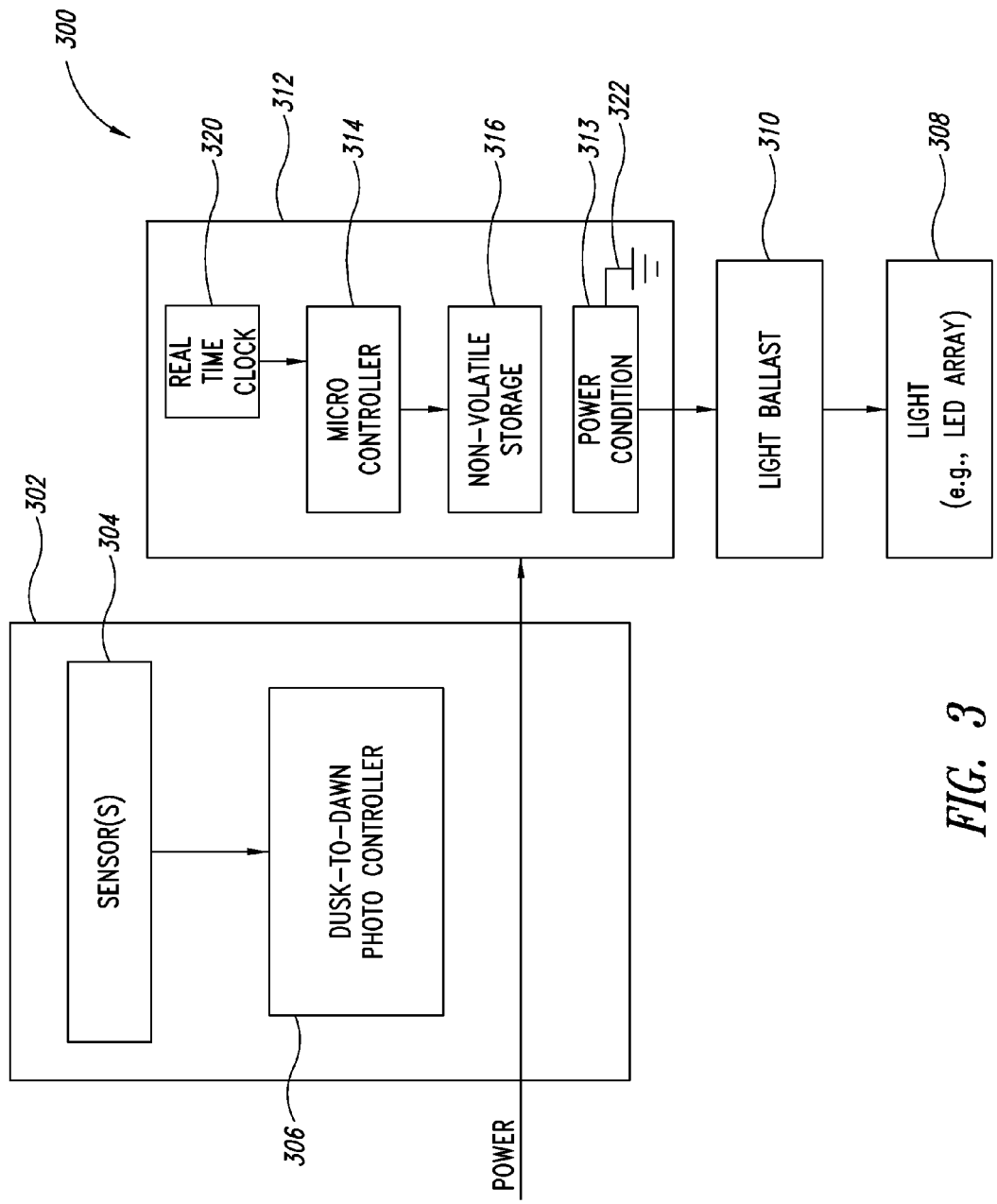
FIG. 3 is a schematic diagram showing a conventional luminaire with optical sensor(s) and a dusk-to-dawn control mechanism, a light source and a retrofit control subsystem, according to one non-limiting illustrated embodiment.

FIG. 3 schematically illustrates an illumination system 300, according to one non-limiting illustrated embodiment.

The illumination system 300 may employ a conventional luminaire 302, for example identical or similar to those illustrated in FIGS. 1 and 2. The luminaire 302 may include an optical sensor 304 and a control mechanism 306. The optical sensor 304 can take any variety of forms, including light sensitive or light responsive photosensors, cadmium sulfide cells, photodiodes, phototransistors, ambient light sensor integrated circuits currently commercially available. The control mechanism 306 may be an analog circuit, digital circuit or may include both analog and digital circuit components. Again, a conventional commercially available luminaire with an integral control mechanism may be employed.

The illumination system 300 may include at least one illumination or light source 308, for example identical or similar to those discussed with reference to FIG. 1. In particular, the illumination system 300 may employ a light source 308 that includes an array of solid-state light sources or emitters, such as LEDs, OLEDs or PLEDs. The illumination system 300 may include a ballast 310 for the light source 308. The ballast 310 may be an integral or unitary part of the light source 308, or may be a separate discrete component therefrom.

As previously explained, the control mechanism 306 may take the form of a dusk-to-dawn photo control mechanism configured to turn the light source(s) 308 ON when the sensor 304 senses a level of illumination or light in the environment that is at or below a turn ON threshold. The control mechanism 306 may be configured to turn the light source(s) 308 OFF when the sensor 304 senses a level of light in the environment that is at or above a turn OFF threshold. While the turn ON and turn OFF thresholds could be equivalent, such would likely produce undesirable oscillation. Hence, some separation should be maintained between the turn ON and turn OFF thresholds. For example, the turn ON threshold may equal 10 LUX while the turn OFF threshold may equal 30 LUX.

The illumination system 300 may include one more retrofit control subsystems 312. The retrofit control subsystem 312 may be identical or similar to the retrofit control subsystem 106, 206 (FIGS. 1 and 2). The retrofit control subsystem 312 may, for example, include a microcontroller 314 and one or more nonvolatile storage media 316 communicatively coupled to the microcontroller 314. The microcontroller 314 may take any of a variety of forms, for example a microprocessor, programmable gate array (PGA), application specific integrated circuit (ASIC), etc. The nonvolatile storage media 316 may take any of a variety of forms, for example electrically erasable programmable read only memories (EEPROMs), flash memories, etc.

The retrofit control subsystem 312 is electrically coupled to the control mechanism 306 of the luminaire 302, for example via a socket and base. The components of the retrofit control subsystem 312 may receive power via this coupling or a standalone power source may be included. The retrofit control subsystem 312 may include power supply circuitry 313 that rectifies, steps down a voltage and otherwise transforms or conditions supplied electrical power to a form suitable to power the microcontroller 314, nonvolatile storage media 316 and/or other components of the retrofit control subsystem 312.

While illustrated as coupled between the luminaire 302 and light source 308, some embodiments may employ one or more relays (not illustrated) to provide electrical power to the light source 308 from the luminaire 302. The retrofit control subsystem 312 may employ a conventional light dimmer circuit to control light level output by the light source 308. Alternatively or additionally, a network link to a programmable lamp controller may be employed. Alternatively or additionally, an analog voltage applied to a dimmable lamp controller may be employed. Alternatively or additionally, the retrofit control subsystem may use one or more switches (e.g., contact switches, relays, transistors, triacs) to switch in or out individual or groups of light emitters that make up one or more light sources, or lamp controllers which control the light sources.

The retrofit control subsystem 312 receives signals from the control mechanism 306 of the luminaire 302 which are indicative of when the control mechanism 306 attempts to turn the light source 308 ON and OFF in response to a sensed illumination level being below a turn On threshold and below a turn OFF threshold, respectively. The signals may be as simple as providing electrical power to power the light source 308 then not providing electrical power. The microcontroller 314 of the retrofit control subsystem 312 may store information to the nonvolatile storage media 316 related to the turning ON and OFF of the light source 308. For example, the microcontroller 314 can determine a length of time between a successive turning ON and turning OFF signal in daily cycle. The microcontroller 314 can determine an average or median for the lengths of time for each of a number of daily cycles. The microcontroller 314 can use the average or median length of time to perform a number of functions. For example, the microcontroller 314 can determine or predict when or how long after a turn ON event a turn OFF event will occur. Such allows the microcontroller 314 to determine when to increase a level of illumination provided by the light source before the predicted turn OFF event.

The microcontroller 314 can also use the determined average or median in setting lengths of time at which a particular level of illumination will be produced. For example, the microcontroller 314 may set the length of time or period following turning ON during which the illumination level is maintained high. The microcontroller 314 may set the length of time or period preceding turning OFF during which the illumination level is maintained high. Additionally or alternatively, the microcontroller 314 may set the length of time or period during which the illumination level is maintained low. In one example, the average or median total length of time between turning ON and turning OFF may be divided into three periods, a first period immediately following turning ON when illumination is at a first level (e.g., relative high) a second period immediately following the first period when illumination is reduced to a second level (e.g., relatively low), and a third period immediately following the second period and preceding turning OFF during which the illumination is increased to a third level (e.g., relatively high). The first and the third periods may be equal (i.e., approximately equal durations) to one another (e.g., 4 hours), with the second period varying in length according to the length of nighttime over the year. Alternatively, the three periods may be equal to one another, the periods varying over the year.

Further, the microcontroller 314 can determine if a current length of time is significantly less (e.g., outside a defined threshold) than an average or median length of time. Such may indicate that the sensors is detecting an artificial source of light, for example light other than solar insolation. In such a situation, the microcontroller 314 may ignore the length of time from the current daily cycle when calculating the average or median. For instance, the microcontroller 314 may not store the current length to the nonvolatile storage media 316, so as to prevent that particular current length from being used in future determinations of averages or median.

In response to a current length of time being significantly less than an average or median length of time, the microcontroller 314 may trigger a new teaching or training cycle. During a teaching or training cycle, the microcontroller may maintain a constant level of light during the entire period between turning ON and turning OFF. Such may allow the microcontroller 314 to collect new information and establish a new average or median. The new teaching or training cycle may last for a single daily cycle or multiple daily cycles.

In some embodiments, the retrofit control subsystem 312 may include a real time or solar clock 320 (i.e., a clock that tracks time in the real world or with respect to the sun, rather than an internal clock of a processor based system). Alternatively, the microcontroller 314 may implement a real time or solar clock. Such embodiments may also include a discrete internal power source 322 (e.g., battery cells, capacitors, super- or ultracapacitors, fuel cell) to supply power to the clock 320 while power is not being received from the control mechanism 302 of the luminaire. The internal power source 322 may be rechargeable, via the power supply circuitry 313. The microcontroller 314 may determine solar midnight, from time-to-time (e.g., each daily cycle). In particular, the microcontroller may divide the average or median time that the light source is ON in half, which should occur at the darkest time of the daily cycle (e.g., solar midnight). The microcontroller 314 may calibrate the real time clock with the determined solar midnight. The microcontroller 314 may control the increasing and decreasing of the level of light output by the light source using the calibrated real time clock. This can prevent or reduce the effect of artificial lights on the illumination system 300.

The operation is further described with reference to the methods illustrated in FIGS. 7-13, below.

Figure 4:
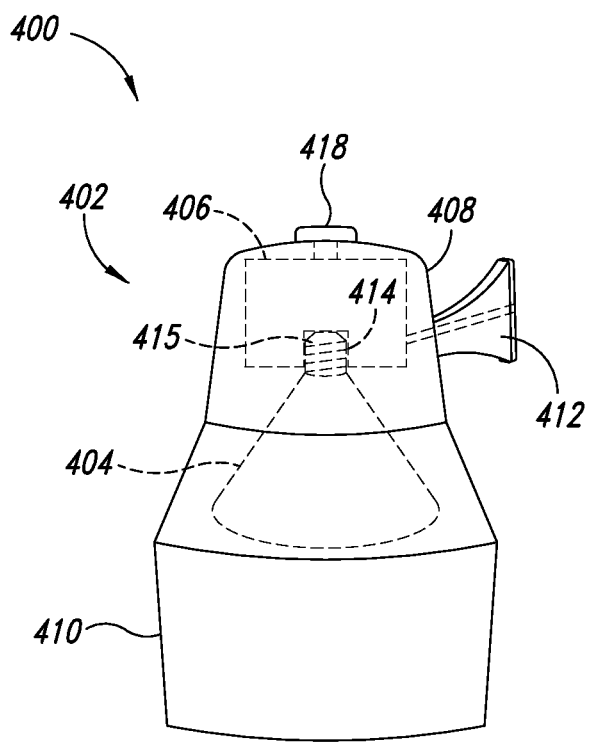
FIG. 4 is an isometric diagram showing a luminaire including an integral control subsystem and a light source, according to another non-limiting illustrated embodiment.

FIG. 4 shows an illumination system 400 according to one non-limiting illustrated embodiment. The illumination system 400 includes a luminaire 402, at least one light source 404, and an integral control subsystem 406 that is integral to the luminaire 402.

As described above, the luminaire 402 can take a large variety of forms. Such forms may hold one, two or more light sources 404, and may be similar to forms that are commercially available. The luminaire 402 may include a housing 408, shade 410, and optionally a bracket 412 to attach the luminaire to a structure.

The light source 404 can take a large variety for forms, for example the various forms described above. The light source 404 may be removably coupled to the luminaire 402, for instance via a threaded base 415 threadedly received by a socket or receptacle 414. Alternatively, the light source 404 may be integral to the luminaire 402, particularly where the light source 404 includes a plurality of solid-state light emitters.

The integral control subsystem 406 includes circuitry to control operation of the illumination system 400 in a similar fashion to the operation described above. In particular, the integral control subsystem 406 includes at least one sensor 418 (e.g., photosensor, cadmium sulfide cell, photodiode, phototransistor, ambient light sensor integrated circuit) that is responsive to a level of light in the environment (e.g., daylight or ambient light). The sensor 418 may be positioned to minimize an effect of the light source 404 on the sensor 418. For example, the sensor 418 may be positioned on top of the housing 408.

In contrast to the illumination systems 100, 200 of FIGS. 1 and 2 which receives signals from the control mechanism, in the illumination system 400 the control subsystem 400 may be coupled to receive signals directly from the sensor 418. Thus, instead of receiving ON and OFF switching or power signals, the control subsystem 400 may receive signals indicative of a sensed level of light in the environment. Thus, in addition to the previously described operation, the control subsystem 406 determines when the sensed level of light is at or below a turn ON threshold and when the sensed level of light is at or above a turn OFF threshold.

Figure 5:
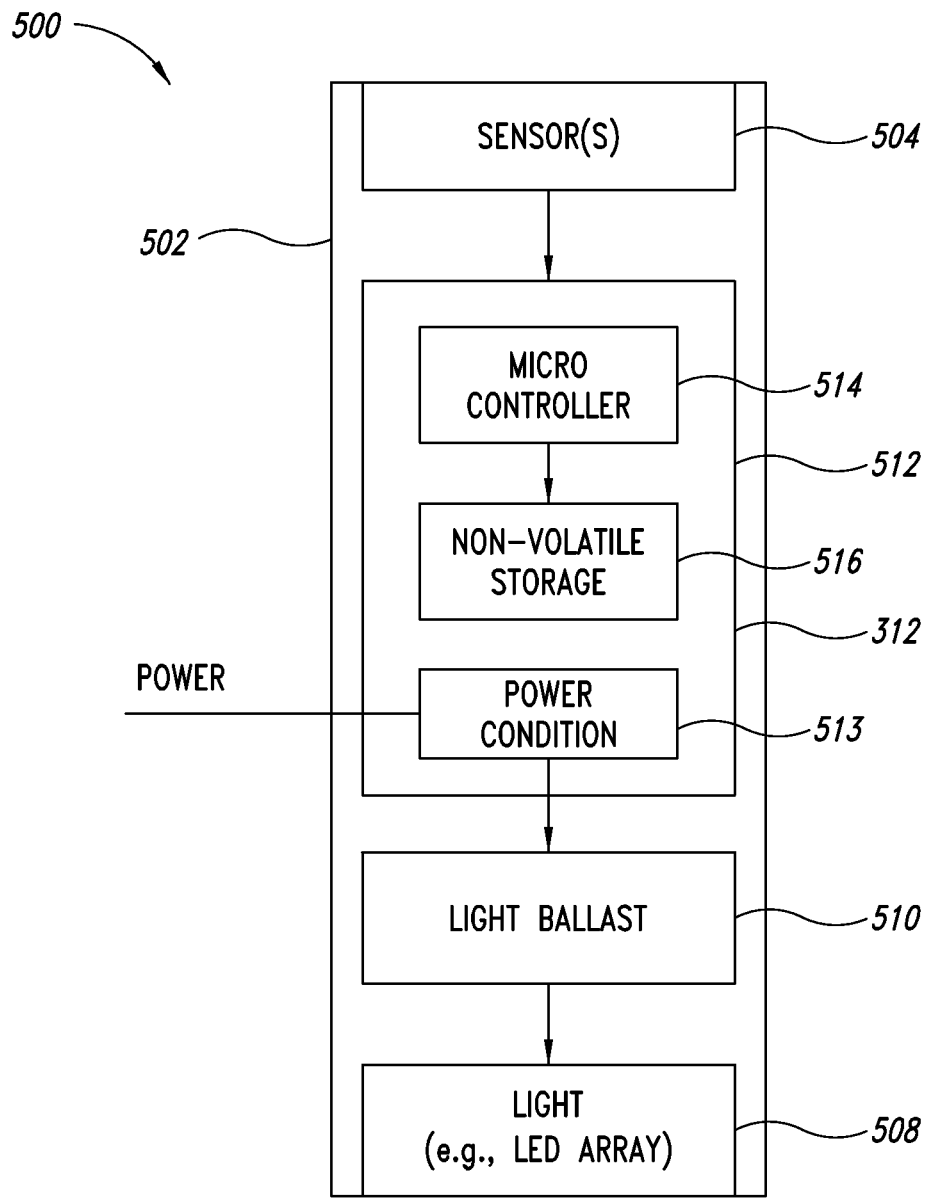
FIG. 5 is a schematic diagram showing the luminaire of FIG. 4 with the integral control subsystem, and a light source.

FIG. 5 schematically illustrates an illumination system 500, according to one non-limiting illustrated embodiment. The illumination system 500 may be identical or similar to the illumination system 400 illustrated in FIG. 4.

The illumination system 500 may employ a conventional luminaire 502, for example identical or similar to that illustrated in FIG. 3, or of any other style. The illumination system 500 includes one or more light sources 508 and optionally one or more ballasts 510 for the light sources 508. Suitable examples of light sources 508 are described above.

The illumination system 500 includes an integral control subsystem 512 which is integral to the luminaire. The integral control subsystem 512 may be identical or similar to the integral control subsystem 406 (FIG. 4). The integral control subsystem 512 may include a sensor 504 that senses or is responsive to varying levels of light. The sensor 504 may take a variety of forms, some of which are described above. The integral control subsystem 512 may, for example, include a microcontroller 514 and one or more nonvolatile storage media 516 communicatively coupled to the microcontroller 514. The microcontroller 514 may take any of a variety of forms, for example a microprocessor, programmable gate array (PGA), application specific integrated circuit (ASIC), etc. The nonvolatile storage media 516 may take any of a variety of forms, for example electrically erasable programmable read only memories (EEPROMs), flash memories, etc. The microcontroller 514 may be communicatively coupled to receive signals directly from the sensor 504. The components of the retrofit control subsystem 312 may receive power via this coupling or a standalone power source may be included. The integral control subsystem 512 may include circuitry 513 that rectifies, steps down a voltage and otherwise conditions supplied electrical power to a form suitable to power the microcontroller 514, nonvolatile storage media 516 and/or other components of the integral control subsystem 512.

The integral control subsystem 512 may employ a variety of switches or other mechanisms to turn the light source 508 ON and OFF and to adjust the level of light output by the light source 508. For example, the integral control subsystem 512 may employ various switches or conventional dimmer circuits, for instance those circuits and circuit components discussed above in reference to the retrofit control subsystem 312. Like the retrofit control subsystem 312, the integral control subsystem 512 may adjust the level of light by adjusting a level of light emitted by each discrete light emitter and/or by adjusting the number of discrete light emitters emitting light.

The microcontroller 514 receives signals from the sensor 504 which are indicative of levels of light sensed in the environment around or proximate the sensor 504. The microcontroller 514, or some dedicated circuit, compares the signals to a turn ON threshold and a turn OFF threshold. The microcontroller 514 determines whether the sensed level of light is at or below a turn ON threshold, indicating that lighting is required. In response, the microcontroller 514 causes the light source to be turned ON at a first output level, which is typically relative high for the light source. The microcontroller 514 may also start a timer, which may be integral to the microcontroller or a dedicated circuit. The microcontroller 514 determines whether the sensed level of light is at or above a turn OFF threshold, indicating that lighting is no longer required. In response, the microcontroller 514 causes the light source to be turned OFF. The microcontroller 514 may also stop a timer, and determine the total duration of time between occurrence of successive turn ON and turn OFF conditions or duration of time that the light was ON. The microcontroller may store the duration or a value representing the duration to the nonvolatile storage media 516. Alternatively, or additionally, the microcontroller may determine a new average or median of durations of time for several daily cycles and store such to the nonvolatile storage media 516.

Appropriate time delays hysteresis may be added or built into the control subsystem 512 before the light source 110 is turned ON or OFF. During these, sensed illumination levels remain approximately constant or the microcontroller 514 will not register a single occurrence of an ON or OFF threshold being met. This suppresses short-term noise events and thereby avoids the microcontroller 514 from being falsely triggered to activate the light source 110 due to short-term events such as vehicle headlights or a transient moving object.

The microcontroller 514 also determines when to adjust the level of output, the adjustment occurring between turning the light source ON and OFF in a daily cycle. Such has been described above, and is described in more detail below with reference to the various methods illustrated in the flow diagrams.

While not illustrated, some embodiments of the integral control subsystem 512 may include or implement a real time or solar clock, similar to that discussed with reference to FIG. 3, above. While such embodiment may include a discrete internal power source, such typically would not be necessary where the integrated control subsystem 512 receives power directly from the AC power mains, rather than via a dusk-to-dawn control mechanism. The microcontroller 514 may control the turning ON and OFF as well as the increasing and decreasing of the level of light output by the light source using the calibrated real time clock.

Figure 6A:
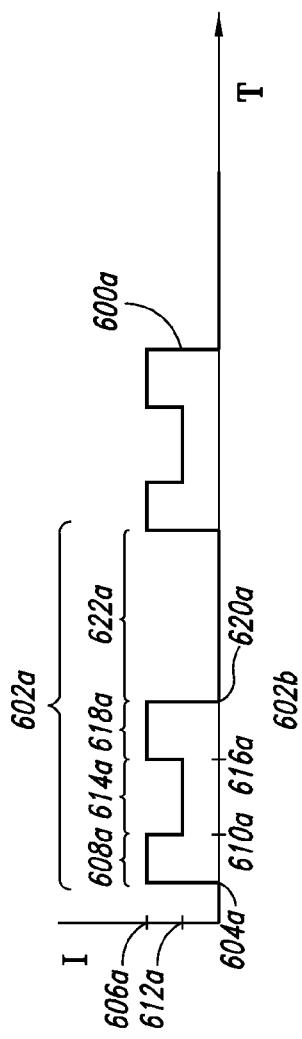
FIG. 6A is a graph showing a level of illumination or output versus time over two daily cycles during a first part of a year, according to another non-limiting illustrated embodiment.

FIG. 6A shows a graph 600a of a level of light produced by a light source over time during a first part of a year, according to one non-limiting illustrated embodiment.

In particular, the level of light output by the light source is shown along the Y-axis, while time is shown along the X-axis. In a first daily cycle 602a, the light source is turned on at 604a to produce light at a first level (e.g., relatively high) 606a for a first duration 608a. The level of light produced by the light source is then adjusted at 610a to produce a lower level 612a of light for a second duration 614a. The level of light produced is then adjusted at 616a to produce a higher level 606a of light for a third duration 618a. While illustrated as equal to the level 606a of the first duration 608a, the level 606a of the third duration 618a may be greater or less than the level 606a during the first duration 608a. The light source is then turned off at 620a for a fourth duration 622a during the daily cycle 602a. As illustrated, this repeats for additional daily cycles, although the length of the various durations may gradually change, for example as the amount of daylight during the daily cycle changes.

Figure 6B:
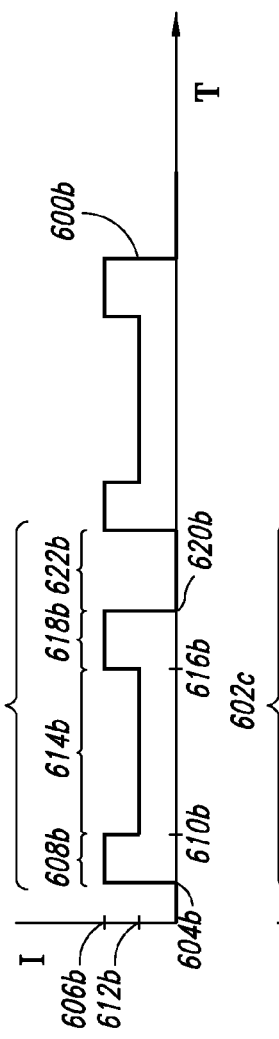
FIG. 6B is a graph showing a level of illumination or output versus time over two daily cycles during a second part of a year.

FIG. 6B shows a graph 600b of a level of light produced by a light source over time during a first part of a year, according to one non-limiting illustrated embodiment.

Times or durations corresponding to those of FIG. 6A are called out using the same reference numerals but with the lower case letter "b" in stead of the lower case letter "a" used in FIG. 6A. The pattern is similar to that illustrated in FIG. 6A, however the second duration 614b at the lower level 612b is longer than that illustrated in FIG. 6A. Such is in response to the amount of daylight in the daily cycle 602b being shorter that that illustrated in FIG. 6A. Thus, FIG. 6A may represent summer in the Northern Hemisphere, while FIG. 6B may represent winter in the same location.

Figure 6C:
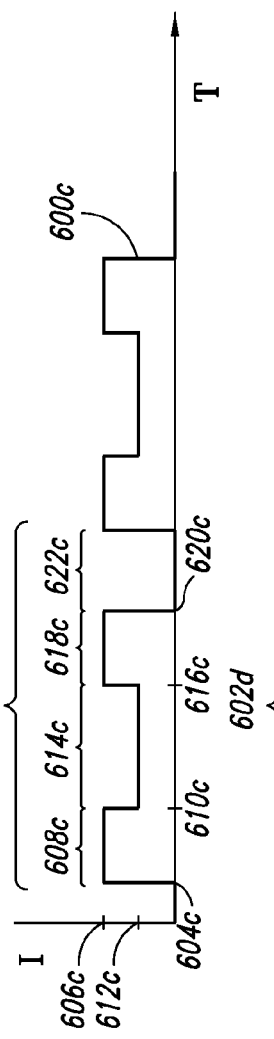

FIG. 6C shows a graph 600c of a level of light produced by a light source over time during a first part of a year, according to one non-limiting illustrated embodiment.

Times or durations corresponding to those of FIG. 6A and 6B are called out using the same reference numerals but with the lower case letter "c" instead of the lower case letter "a" or "b" used in FIGS. 6A and 6B, respectively. The pattern is similar to that illustrated in FIG. 6B, however the first and third durations 608c, 618c at the high level 606c are longer than that illustrated in FIG. 6B. Such durations 608c, 618c may be factory set or may be user configurable, set based on user input received via a user interface (e.g., buttons, switches, dials, potentiometers, shorting jumpers, wired or wireless communications ports, or via power line carrier control) of the luminaire. Such user input may, for instance, indicate a fixed time for the first and third durations or may indicate percentages of the total period that the light source is turned ON that should be apportioned to the first and third durations.

Figure 6D:
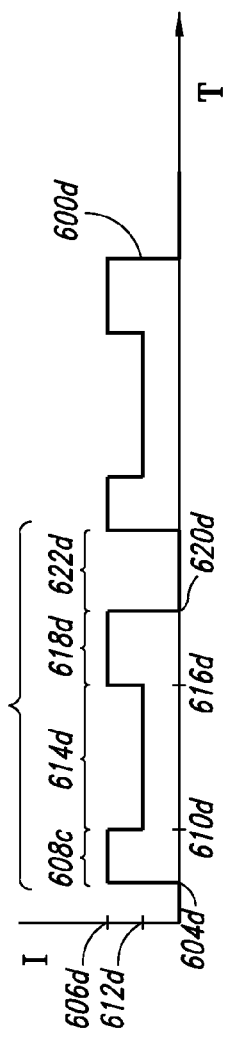
FIG. 6D is a graph showing a level of illumination or output versus time over two daily cycles during the second part of a year, according to another non-limiting illustrated embodiment where a length of time of high intensity immediately following turn ON is different from a length of time of high intensity immediately preceding turn OFF of the light source.

FIG. 6D shows a graph 600d of a level of light produced by a light source over time during a first part of a year, according to one non-limiting illustrated embodiment.

Times or durations corresponding to those of FIGS. 6A-6C are called out using the same reference numerals but with the lower case letter "d" instead of the lower case letter "a" "b" or "c" used in FIGS. 6A-6C, respectively. The pattern is similar to that illustrated in FIG. 6C, however the first and third durations 608d, 618d are of unequal lengths with respect to one another. As previously noted, such durations 608d, 618d may be user configurable, set based on user input received via a user interface (e.g., buttons, switches, dials, communications port) of the luminaire.

Figure 7:
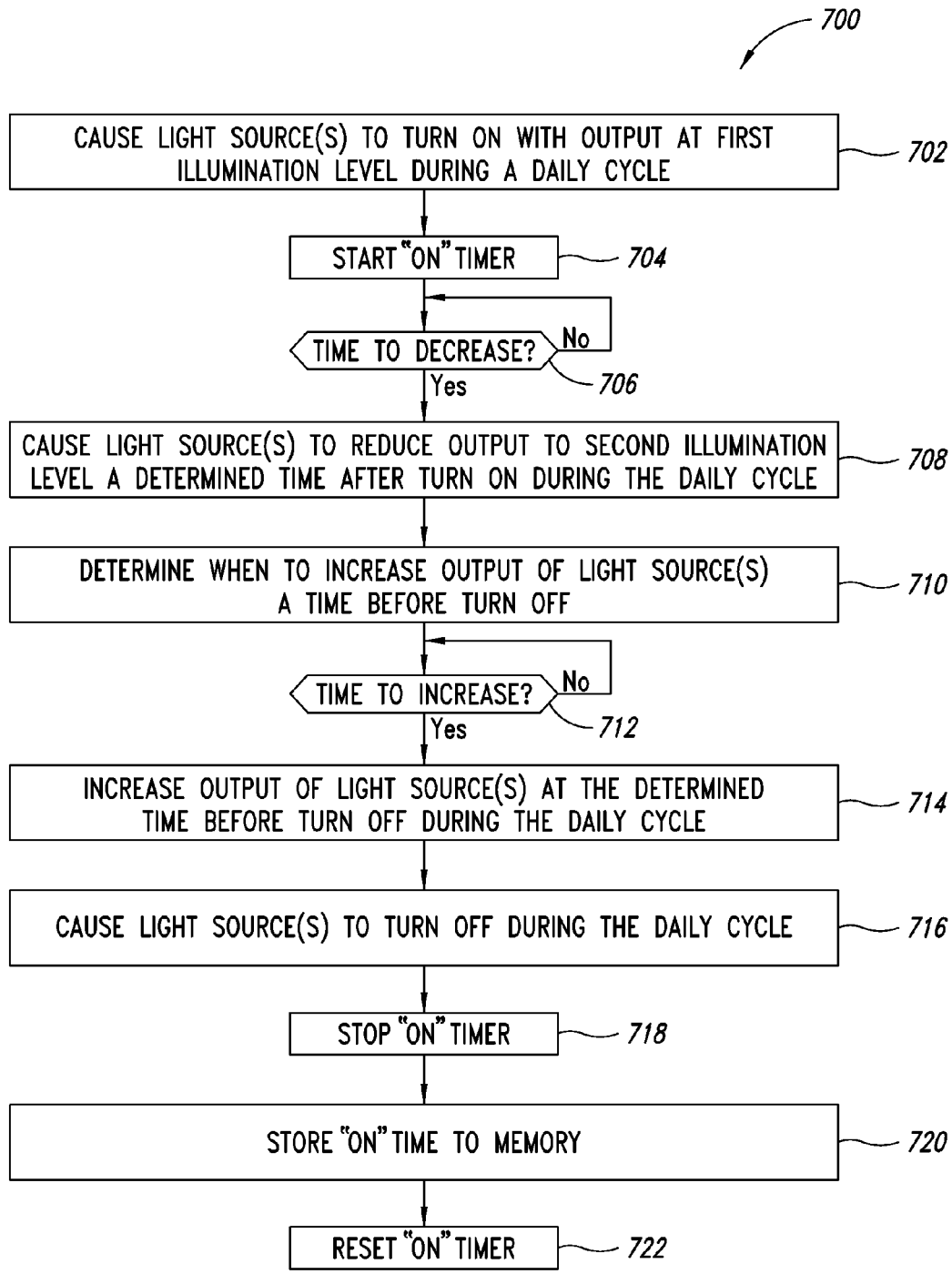
FIG. 7 is a flow diagram showing a high level method of operating an illumination system to provide illumination in an energy efficient manner, according to one non-limiting illustrated embodiment.

FIG. 7 shows a high level method 700 of operating an illumination system to provide illumination in an energy efficient manner, according to one non-limiting illustrated embodiment.

At 702, at least one component of the illumination system causes at least one light source of the illumination system to be turned ON at a first illumination level during a current one of a number of daily cycles. For example, a control mechanism of the luminaire, retrofit control subsystem or integral control subsystem may determine that a sensed level of light is at or below a turn ON threshold. In response, the control mechanism, retrofit or integral control subsystem may direct power from an external power source to the light source, for instance via a relay or other switch. Thus, where a retrofit control subsystem is employed, the control mechanism of the luminaire causes the light source to be turned ON. Where an integral control subsystem is employed, the integral control subsystem may cause the light source to be turned ON.

At 704, the retrofit control subsystem or integral control subsystem starts an "ON" timer in response to the turning ON of the light source. The "ON" timer may be implemented by the microcontroller, or by a discrete circuit.

At 706 the microcontroller repeatedly determines whether the time to decrease the level of light output by the light source has been reached, control passing to 708 upon achieving the condition. In particular, the microcontroller may compare a time indicated by the "ON" timer to an "increase" time stored in nonvolatile storage media or in a register of the microcontroller. As described herein, the "increase" time may determined as either a fixed or variable delay after turning ON the light source.

At 708, at least one component of the illumination system causes a level of illumination produced by the at least one light source to be reduced from the first level to a non-zero level between the at least one illumination source being turned ON and OFF during the current one of the daily cycles. For example, the control mechanism of the luminaire, or the retrofit or integral control subsystem may reduce power supplied to the light source after a first duration following turning ON of the light source. Depending on the particular type of light source, the control mechanism, retrofit or integral control subsystem may rectify and/or reduce a voltage, current, or duty cycle of the electrical power via any variety of electrical or electronic circuitry (e.g., rheostat, DC/DC converter, other power regulator). Alternatively, or additionally, one or more distinct light emitters of the light source may be turned OFF from an ON state, to decrease the level of light by decreasing a total number of light emitters in the ON state. The length of the first duration may, for example, be factory set or may be user configurable via a user input interface. Where factory set or user configurable, the length may be a fixed period. Alternatively, the control mechanism, retrofit or integral control subsystem may determine the length of the first duration based on one or more parameters, for example sensed information. For instance, the length of the first duration may be a function of the total amount of daylight or night in a daily cycle. Thus, the length of the first duration may vary throughout the year to accommodate seasonal changes in the length of daylight.

At 710, at least one component of the illumination system determines when to cause the level of illumination produced by the at least one illumination source to be increased. The increase is to occur between causing the level of illumination produced by the at least one illumination source to be reduced from the first level and the turning OFF of the at least one illumination source. The determining may be based at least in part on the level of illumination that is sensed during at least one previous one of the daily cycles, which occurred before the current one of the daily cycles. For example, the retrofit or integral control subsystem may determine when to cause the level of illumination to be increased based at least in part on an average or median of the total time that the light source is turned ON over a number (e.g., 10) of recent ones of the daily cycles. Such may provide a good estimate or approximation of the amount of darkness or nighttime in the daily cycle at the given time of the year. Such not only allows the retrofit or integral control subsystem to accommodate changes in the relative amounts of daylight and darkness throughout the year, but also to accommodate variations in the relative amounts of daylight and darkness at different geographic locations. Thus, for example, a single retrofit or integral control subsystem may be sold and/or installed in locations at widely different latitudes (e.g., Miami, Fla. and Nome, Ak.).

Notably, the variation in the length of daylight/nighttime is more extreme the farther a location is from the Equator. Such retrofit or integral control subsystem can automatically accommodate to the significant differences between locales. The microcontroller may store the time (e.g., time relative to turning ON, time indicated by real time clock) in the nonvolatile storage media.

At 712, the microcontroller repeatedly determines whether the time to increase has been reached, control passing to 714 upon achieving the condition. In particular, the microcontroller may compare a time indicated by the "ON" timer to the time stored in the nonvolatile storage media or a register of the microcontroller.

At 716, at least one component of the illumination system causes the level of illumination produced by the at least one illumination source to be increased between the causing the level of illumination produced by the at least one illumination source to be reduced and the at least one illumination source being turned OFF during the current one of the daily cycles. For example, the control mechanism of the luminaire, or the retrofit or integral control subsystem may increase power supplied to the light source after a third duration, following reduction in level of illumination and proceeding the turning OFF of the light source. Depending on the particular type of light source, the control mechanism, retrofit or integral control subsystem may increase a voltage, current, or duty cycle of the electrical power via any variety of electrical or electronic circuitry (e.g., rheostat, DC/DC converter). Alternatively, or additionally, one or more distinct light emitters of the light source may be turned ON from an OFF state, to increase the level of light by increasing the total number of light emitters in the ON state. The length of the third duration may, for example, be factory set or may be user configurable via a user input interface. Where factory set or user configurable, the length may be a fixed period. Alternatively, the control mechanism, retrofit or integral control subsystem may determine the length of the third duration based on one or more parameters, for example sensed information. For instance, the length of the third duration may be a function of the total amount of daylight or night in a daily cycle. Thus, the length of the third duration may vary throughout the year to accommodate seasonal changes in the length of daylight. The length of the third duration may be equal to the length of the first duration, or may be different therefrom.

At 716, at least one component of the illumination system causes the at least one illumination source to be turned OFF during the current one of the daily cycles. For example, a control mechanism of the luminaire, retrofit control subsystem or integral control subsystem may determine that a sensed level of light is at or above a turn OFF threshold. In response, the control mechanism, retrofit or integral control subsystem may direct power from an external power source of the light source, for instance via a relay or other switch. Notably, the value of the turn OFF threshold may be the same as the turn ON threshold or may be different from the turn ON threshold.

At 718, the microcontroller of the retrofit control subsystem or integral control subsystem stops the "ON" timer in response to the turning OFF of the light source.

At 720, the microcontroller stores a value indicative of the time elapsed on the "ON" timer to nonvolatile storage media. The stored value is indicative of an amount of time that the light source was turned ON during the daily cycle. In particular, a microcontroller may store a value to a nonvolatile storage media such as a memory. The microcontroller uses such elapsed time in determining averages and medians for future daily cycles. For example, such may be used to determine an average and/or median of turn ON times over a number N of previous ones of daily cycles. The nonvolatile storage media may have a limited storage, allowing only a set number of values to be stored. Such should be sized large enough to allow a statistically good representative sampling (e.g., 3 or more), yet not be so large as to make the system non-responsive to seasonal changes (e.g., less than 20). Determining averages or medians based on samples from between 5 and 15 daily cycles appears to be suitable.

At 722, the retrofit control subsystem or integral control subsystem resets the "ON" timer in preparation for the next ON/OFF cycle. The method 700 may repeat, continuously or intermittently.

Figure 8:
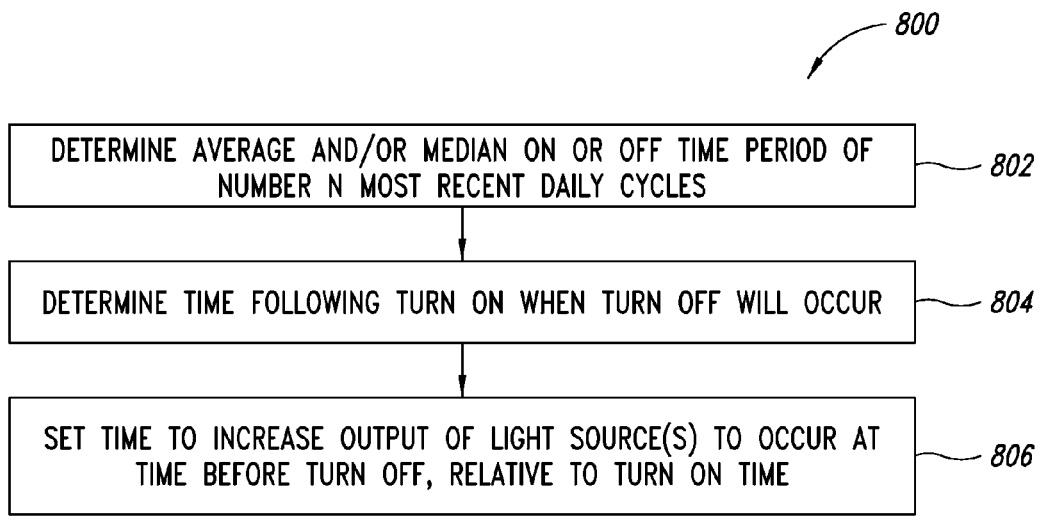
FIG. 8 is a flow diagram showing a low level method of operating a control subsystem of an illumination system to determine a when to increase a level of light output, according to one non-limiting illustrated embodiment.

FIG. 8 shows a method 800 of operating a retrofit or integral control subsystem to determine a when to increase a level of light output, according to one non-limiting illustrated embodiment. The method 800 may be employed with the method 700 (FIG. 7).

At 802, the retrofit or integral control subsystem determines at least one of an average and/or a median of time that the light source is ON or OFF during a number N of most recent daily cycles. For example, a microcontroller may determine an average and/or median based on values stored in a nonvolatile storage media which represent the amount of time the light source was ON, or alternatively OFF, for each of a number of previous daily cycles. As noted above, the number of daily cycles should be sufficiently large to allow a statistically meaningful sampling but not so large as to make the determination non-responsive to changes in the amounts of daylight and nighttime which occur throughout a year. Such limits on the number of samples is not necessarily required for the retrofit or integral control subsystem to function, but will likely improve performance. Thus, a different number of samples may be employed in practice. For example, when initially starting or when restarting, the retrofit or integral control subsystem may employ only a single daily cycle, increasing the number of daily cycles as information is collected and stored. In particular, the retrofit or integral control subsystem may perform a teaching or training cycle, which is described in more detail with reference to FIG. 13, below.

At 804, the retrofit or integral control subsystem determines a time following the turning ON of the light source when turn OFF will occur. Since turn OFF is based on sensing a level of light being at or above a turn OFF threshold, the retrofit or integral control subsystem cannot know ahead of time precisely when that event will occur. However, the adjustment to increase light level must occur sometime before this event. Thus, the retrofit or integral control subsystem predicts the occurrence of this event based on a sampling of recent daily cycles.

In particular, the retrofit or integral control subsystem may use an average or median of a number of samples to determine how long the light has been turned ON in recent previous daily cycles. Thus, the retrofit or integral control subsystem can determine how long after a current turning ON of the light source a turn OFF event will likely occur. While such may not be precise, the prediction should be reasonably accurate to the task of providing lighting in an energy efficient manner.

At 806, the retrofit or integral control subsystem sets a time to increase the output of the light source to occur for a period of time before turning OFF the light source. As noted above, this time may be expressed relative to the turning ON of the light source, which is an event that can be sensed. In particular, the retrofit or integral control subsystem may set at a time that is a defined duration before the predicted occurrence of the turn OFF.

Figure 9:
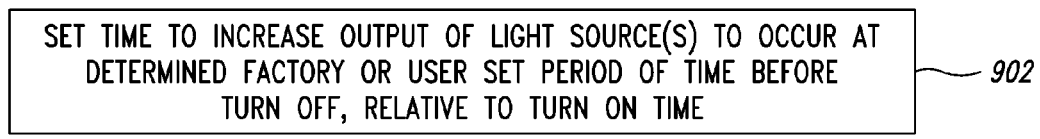
FIG. 9 is a flow diagram showing a low level method of operating a control subsystem to set a time at which to increase a level of light output, according to one non-limiting illustrated embodiment.

For instance, as illustrated in FIG. 9, the retrofit or integral control subsystem may perform a method 900 which at 902 sets the time based on a factory or user set duration (e.g., 2 hours, 3, hours, 4 hours).

Figure 10:
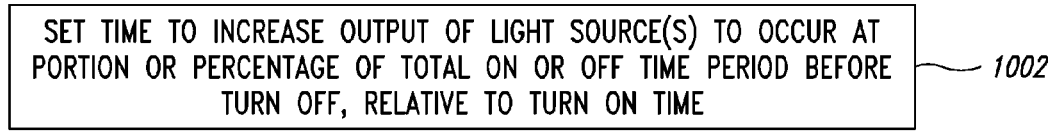
FIG. 10 is a flow diagram showing a low level method of operating a control subsystem to set a time at which to increase a level of light output, according to another non-limiting illustrated embodiment.

Alternatively, as illustrated in FIG. 10, the retrofit or integral control subsystem may perform a method 1000 which at 1002 employs a duration which is a function of one or more variables. For instance, the retrofit or integral control subsystem may set a duration as some percentage (e.g., 33%) of the determined average or median length of time the light source has been ON over a number of previous daily cycles.

Figure 11:
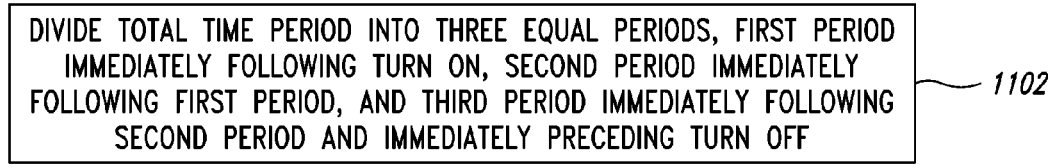
FIG. 11 is a flow diagram showing a low level method of operating a control subsystem to set a time at which to increase a level of light output, according to a further non-limiting illustrated embodiment.

In one example illustrated in FIG. 11, the retrofit or integral control subsystem may perform a method 1100 that at 1102 divides a total or entire time period that the light source is ON into three approximately equally periods, a first period at a relatively high level, second period at a relatively low level, followed by a third period at a relatively high level. Thus, where the length of time between dusk and dawn is 12 hours, the first period of providing light at a relatively high level after turning ON may be four hours long, the second period of providing light at a relatively low level may be 4 hours long and the third period of providing light at a relatively high level before turning OFF may be 4 hours long.

While generally discussed in terms of the total time that the light source is on, the time may actually reflect the duration between sensing a level of light at or below the turn ON threshold and sensing a level of light at or above the turn OFF threshold. For instance, the retrofit control subsystem may simply detect the start and stop of electrical power being supplied to the light source. In contrast, the integral control subsystem may rely on signals received directly from the sensor.

Again, the retrofit or integral control subsystem accommodates changes in the length of daylight/nighttime, as well as locale, by employing an average or mean of a number of recent daily cycles.

Figure 12:
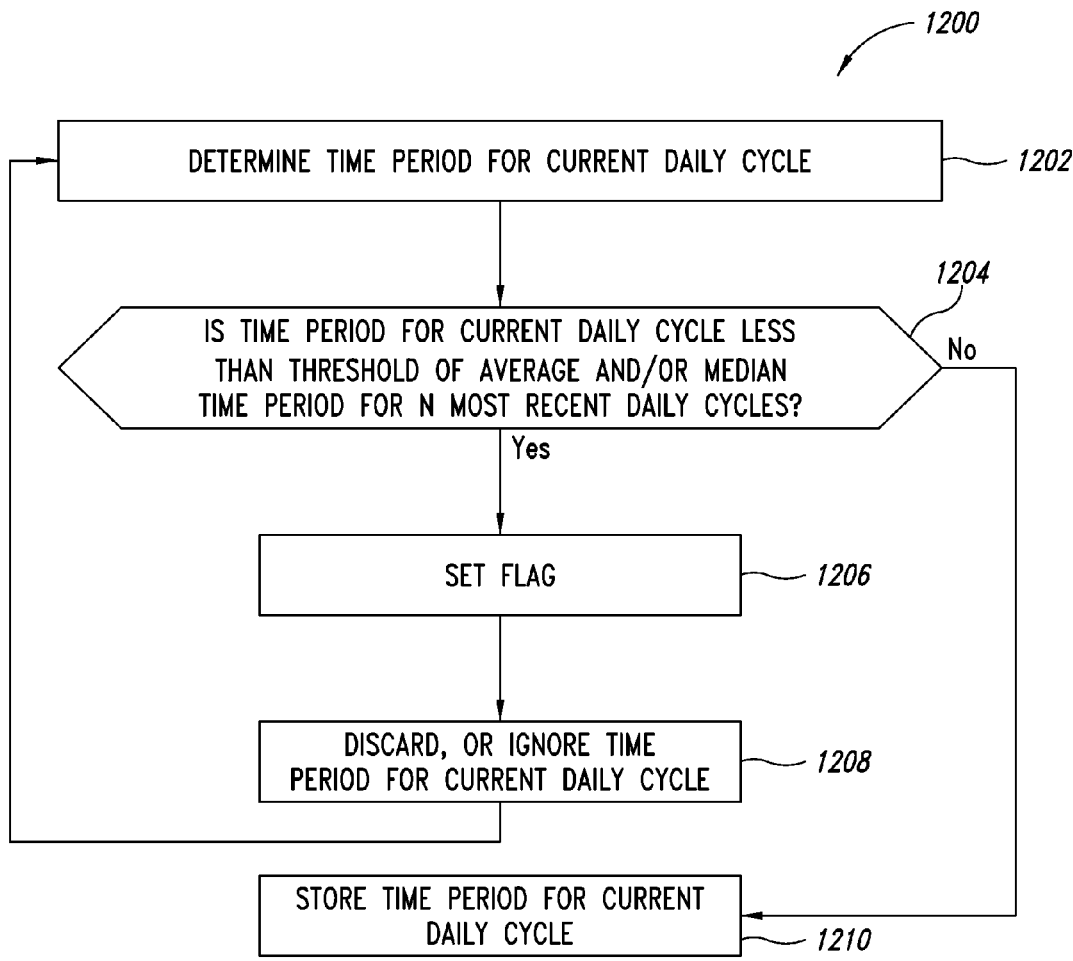
FIG. 12 is a flow diagram showing a low level method of operating a control subsystem to sample time periods during daily cycles, according to one non-limiting illustrated embodiment.

FIG. 12 shows a low level method 1200 of operating a control subsystem to sample time periods during daily cycles, according to one non-limiting illustrated embodiment. The method 1200 may be employed with the method 700 (FIG. 7).

At 1202, the retrofit or integral control subsystem determines a time period that the light source is ON, or alternatively OFF, for a current one of the daily cycles. As noted above, a retrofit control subsystem may detect the application and the removal of electrical power to the light source, or the closing and opening of a relay or other switch that provides a path for the application of electrical power. In contrast, the integral control subsystem may employ signals received from the sensor. Alternatively, the integral control subsystem may detect the application and the removal of electrical power to the light source, or the closing and opening of a relay or other switch.

Optionally at 1204, the retrofit or integral control subsystem may determine whether the time period for the current daily cycle is significantly less than an average or median time period of a number of recent daily cycles. Such effectively filters aberrant instances of the light source being turned ON or OFF from the sampling. Thus, the control subsystem may filter out an event where a sensor detects artificial light (e.g., from a passing vehicle or some other source) that is sufficiently bright to exceed the turn OFF threshold, based on that event occurring too soon after turning ON the light source of the illumination system. The control subsystem may also filter based on the level of the light sensed. For instance, the integral control subsystem may ignore samples where the signal indicates a sensed level of light that exceeds and/or falls below some threshold level of light. The threshold level of light may be the same or similar to the turn ON and/or turn OFF thresholds. If the time period for the current daily cycle is outside of a defined threshold of the average or median time period, control passes to 1206, otherwise control passes to 1210.

Optionally at 1206, the retrofit or integral control subsystem sets a flag to indicate that an aberrant condition was detected. The flag may cause the retrofit or integral control subsystem to enter a teaching or training cycle during the next daily cycle. An example of a teaching or training cycle is discussed with reference to FIG. 13, below.

At 1208, the retrofit or integral control subsystem discards or ignore the time period for the current daily cycle. Such may consist of not storing the time period to the nonvolatile storage media. Such may additionally or alternatively include adjusting or not adjusting a pointer to a location in nonvolatile storage media, accordingly. After discarding or ignoring the time period control may return to 1202.

At 1210, the retrofit or integral control subsystem stores the time period to the nonvolatile storage media. As previously discussed, the nonvolatile storage media may have a limited number of locations in which to store such information. The number of locations can be set to store an adequate number of samples without storing so many samples as to become unresponsive to changes in the length of daylight or nighttime. Thus, the control subsystem may automatically write over existing stored information, for example every number N of daily cycles. Such prevents older samples from being used in determining the average or median, ensuring that samples from only recent daily cycles are employed.

Figure 13:
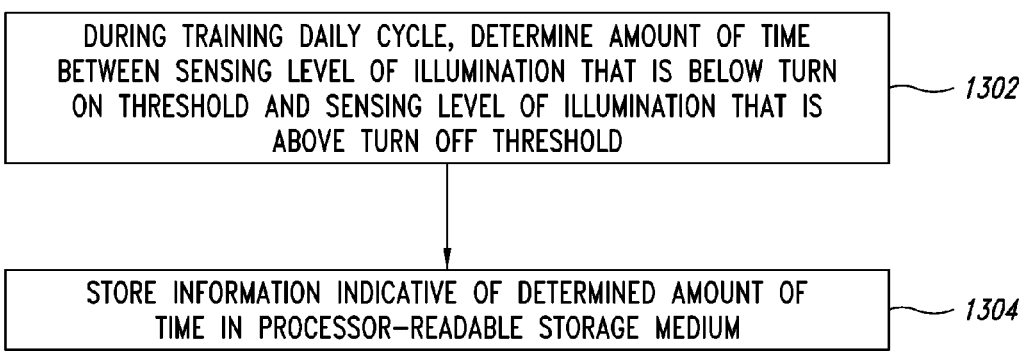
FIG. 13 is a flow diagram showing a method of operating a control subsystem to perform a teaching or training cycle, according to one non-limiting illustrated embodiment.

FIG. 13 shows a method 1300 of operating a control subsystem to performing a teaching or training cycle, according to one non-limiting illustrated embodiment. The method 1300 may be employed with the method 700 (FIG. 7).

The retrofit or integral control subsystem may perform a teaching or training cycle on initially starting up the retrofit or integral control subsystem for the first time or after a period of disuse. Additionally, or alternatively, the retrofit or integral control subsystem may perform a teaching or training cycle from time-to-time, for instance in response to detection of an aberrant condition. The teaching or training cycle may take place over a single daily cycle or over two or more daily cycles.

At 1302, during a daily cycle the integral control subsystem determines an amount of time that occurs between sensing a level of illumination that is below a turn ON threshold and sensing a level of illumination that is above a turn OFF threshold. Alternatively, the retrofit control subsystem may determine an amount of time between power being applied to and removed from the light source.

At 1304, the retrofit or integral control subsystem stores information indicative of the determined amount of time to the nonvolatile storage media.

The retrofit or integral control subsystem may repeat the determining and storing of the method 1300 until some defined number of samples have been stored to the nonvolatile storage media. During the teaching or training cycle, the retrofit or integral control subsystem may maintain the level of light output by the light source at a constant level (e.g., relatively high). Such ensures that adequate light is provided at all hours that the light source is ON, until sufficient samples are acquired to reliably predict how long after turn ON the light source will be turned OFF. Alternatively, the retrofit or integral control subsystem may employ a defined limited duration for the reduced level of light, until sufficient samples are acquired. Such duration should be set conservatively, to not be longer (e.g., 1 hour) than what can safely be anticipated as the period when reduced light levels are acceptable.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, luminaire is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 314, 514 may be programmable and may include one or more input ports (not illustrated) through which a user can program the microcontroller 314, 514. For example, the time delays and the various illumination levels of the light source may be programmed. The input port may include switches and/or potentiometers that can be set to program the microcontroller 314, 514. Alternatively, the input port may include an electrical interface for the user to remotely program the microcontroller 314, 514 whether through a wire or wirelessly. In one embodiment, the input port may be the ambient light sensor which is connected to the microcontroller 314, 514. In one embodiment, the microcontroller 314, 514 is programmable optically via one or more images captured by an image capture device or imager (not illustrated). In one embodiment, printed barcode pages are used to set delay times and other parameters used by the microcontroller 314, 514. The microcontroller 314, 514 may also receive a one-bit input via the input port to activate or deactivate the light source. For example, a binary bit of "0" turns OFF the light source 110 and a binary bit of "1" turns ON the light source.

Also for example, the control subsystem 312, 512 may further include a communication device (not illustrated). The communication device may be communicatively coupled to the microcontroller 314, 514. The communication device may be further coupled to an external data network using protocols in compliance with any or all of the Ethernet, the RS-485 and wireless communication standards, such as the IEEE 802.11 standards for example, or commercially or proprietary power line carrier control standards. The communication device may be used to remotely program the microcontroller 314, 514. Alternatively, the communication device may be used to transmit information from the control subsystem 312, 512 to a remote user or processor based system. For example, the communication device may be used to transmit a notification signal from the microcontroller 314, 514 indicative of turning ON, turning OFF, increasing or decreasing output from a light source. The communication device may be used to transmit an actuation signal from the microcontroller 314, 514 to actuate a device such as an alarm or an automatic door.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Patent Publication No. US 2009/0278474, published Nov. 12, 2009; U.S. Patent Publication No. US 2009/0284155, published Nov. 19, 2009; U.S. Patent Publication No. US 2010/0090577, published Apr. 15, 2010; U.S. Provisional Patent Application No. 61/051,619 filed May 8, 2008; U.S. Provisional Patent Application No. 61/052,924 filed May 13, 2008; U.S. Provisional Patent Application No. 61/088,651 filed Aug. 13, 2008; U.S. Provisional Patent Application No. 61/115,438 filed Nov. 17, 2008; U.S. Provisional Patent Application No. 61/154,619 filed Feb. 23, 2009; U.S. Provisional Patent Application No. 61/174,913 filed May 1, 2009; U.S. Provisional Patent Application No. 61/180,017 filed May 20, 2009; U.S. Provisional Patent Application No. 61/229,435 filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Provisional Patent Application Ser. No. 61/346,263, filed May 19, 2010; and U.S. Nonprovisional patent application Ser. No. 12/784,093, filed May 20, 2010 entitled "APPARATUS AND METHOD OF ENERGY EFFICIENT ILLUMINATION"; are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of operating an outdoor illumination system including at least one sensor and at least one control subsystem separately replaceable from the at least one sensor, the method comprising:
    processing by the at least one separately replaceable control subsystem information indicative of a level of illumination sensed by the at least one sensor over a plurality of daily cycles; the processing by the at least one separately replaceable control subsystem including:
    causing at least one illumination source to be turned ON at a first illumination level during a current one of the daily cycles;
    causing the at least one illumination source to be turned OFF during the current one of the daily cycles;
    causing a level of illumination produced by the at least one illumination source to be reduced from the first level to a non-zero level between the at least one illumination source being turned ON and OFF during the current one of the daily cycles;
    determining when to cause the level of illumination produced by the at least one illumination source to be increased, the increase to occur between the causing the level of illumination produced by the at least one illumination source to be reduced from the first level and the at least one illumination source being turned OFF, the determining based at least in part on the sensed level of illumination sensed during at least one previous one of the daily cycles which occurred before the current one of the daily cycles; and
    causing the level of illumination produced by the at least one illumination source to be increased between the causing the level of illumination produced by the at least one illumination source to be reduced and the at least one illumination source being turned OFF during the current one of the daily cycles.

2. The method of claim 1 wherein determining when to cause the level of illumination produced by the at least one illumination source to be increased based at least in part on the sensed level of illumination sensed during at least one previous one of the daily cycles includes determining at least one of an average or a median of a respective amount of time that the at least one illumination source is either ON or OFF over each of a plurality of previous ones of the daily cycles.

3. The method of claim 2 wherein determining when to cause the level of illumination produced by the at least one illumination source to be increased further includes dividing the determined average or mean into three periods, a first period immediately following the turning ON of the at least one illumination source during which the at least one illumination source is operated at a relatively high level of illumination, a second period following the first period during which the at least one illumination source is operated at a relatively low level of illumination, and a third period following the second period and immediately preceding when the at least one illumination source is turned OFF during which the at least one illumination source is operated at a relatively high level of illumination, wherein at least two of the periods are equal to one another.

4. The method of claim 2 wherein determining when to cause the level of illumination produced by the at least one illumination source to be increased based at least in part on the sensed level of illumination sensed during at least one previous daily cycle includes determining a time which occurs for a determined period before the at least one illumination source is turned OFF based at least in part on the determined average or the median.

5. The method of claim 4 wherein determining when to cause the level of illumination produced by the at least one illumination source to be increased based at least in part on the sensed level of illumination sensed during at least one previous one of the daily cycles includes omitting from the respective amounts of time from which the average or median are determined any amount of time that is substantially shorter than other ones of the amounts of time.

6. The method of claim 4, further comprising:
    determining if any amount of time is substantially shorter than other ones of the amounts of time from which the average or median are determined;
    setting a flag in response to the determination;
    causing the at least one illumination source to be turned ON at the first illumination level until turned OFF during a next one of the daily cycles without causing the level of illumination produced by the at least one illumination source to be reduced during the next one of the daily cycles.

7. The method of claim 4, further comprising:
    adjusting the determined period based on at least one user input.

8. The method of claim 1 wherein causing at least one illumination source to be turned ON at a first illumination level includes causing the at least one illumination source to be turned ON in response to the sensed illumination level during the current one of the daily cycles being equal to or below a turn ON threshold.

9. The method of claim 8 wherein causing the at least one illumination source to be turned OFF includes causing the at least one illumination source to be turned OFF in response to the sensed illumination level during the current one of the daily cycles being equal to or above a turn OFF threshold.

10. The method of claim 8 wherein causing the at least one illumination source to be turned OFF includes causing the at least one illumination source to be turned OFF in response to passage of a determined time after the sensed illumination level during the current one of the daily cycles being equal to or below the turn ON threshold.

11. The method of claim 1, further comprising:
determining a period of time between when the at least one illumination source is turned ON and turned OFF during at least one of the daily cycles;
determining a middle of the determined period; and
wherein determining when to cause the level of illumination produced by the at least one illumination source to be increased based at least in part on the sensed level of illumination sensed during at least one previous one of the daily cycles includes calibrating a clock to the determined middle of the determined period.

12. The method of claim 11 wherein determining when to cause the level of illumination produced by the at least one illumination source to be increased based at least in part on the sensed level of illumination sensed during at least one previous one of the daily cycles includes determining an amount of delay after occurrence of the middle of the determined period on the calibrated clock based on a total duration of the determined period.

13. The method of claim 1, further comprising:
during a training daily cycle, determining an amount of time between sensing a level of illumination that is below a turn ON threshold and sensing a level of illumination that is above a turn OFF threshold; and
storing information indicative of the determined amount of time in a processor-readable storage medium.

14. The method of claim 1, further comprising:
repeatedly sensing with the at least one sensor the level of illumination in an environment over the plurality of daily cycles.

15. A system for outdoor illumination, comprising:
a housing including at least one base for receipt by an existing fixture illumination source receptacle and at least one receptacle for receiving an illumination source base; and
a control subsystem that includes at least one control circuit, the control subsystem communicatively coupled to receive signals from at least one sensor, the control subsystem separately replaceable from the at least one sensor, the received signals indicative of a level of illumination over a plurality of daily cycles and that:
causes at least one illumination source to be turned ON at a first illumination level during a current one of the daily cycles;
causes at least one illumination source to be turned OFF during the current one of the daily cycles;
causes a level of illumination produced by the at least one illumination source to be reduced from the first level to a non-zero level between the at least one illumination source being turned ON and OFF during the current one of the daily cycles;
determines when to cause the level of illumination produced by the at least one illumination source to be increased, the increase to occur between the causing the level of illumination produced by the at least one illumination source to be reduced from the first level and the at least one illumination source being turned OFF, the determining based at least in part on the sensed level of illumination sensed during at least one previous one of the daily cycles which occurred before the current one of the daily cycles; and
causes the level of illumination produced by the at least one illumination source to be increased between the causing the level of illumination produced by the at least one illumination source to be reduced and the at least one illumination source being turned OFF during the current one of the daily cycles.

16. The system of claim 15 wherein the control subsystem determines at least one of an average or a median of a respective amount of time that the at least one illumination source is either ON or OFF over each of a plurality of previous ones of the daily cycles to determine when to cause the level of illumination produced by the at least one illumination source to be increased.

17. The system of claim 16 wherein the control subsystem divides the determined average or mean into three periods, a first period immediately following the turning ON of the at least one illumination source during which the at least one illumination source is operated at a relatively high level of illumination, a second period following the first period during which the at least one illumination source is operated at a relatively low level of illumination, and a third period following the second period and immediately preceding when the at least one illumination source is turned OFF during which the at least one illumination source is operated at a relatively high level of illumination, wherein at least the first and the third periods are equal to one another.

18. The system of claim 16 wherein the control subsystem determines a time which occurs a determined period before the at least one illumination source is turned OFF based at least in part on the determined average or the median to determine when to cause the level of illumination produced by the at least one illumination source to be increased.

19. The system of claim 18 wherein the control subsystem omits from the respective amounts of time from which the average or median are determined any amount of time that is substantially shorter than other ones of the amounts of time.

20. The system of claim 18 wherein the control subsystem further adjusts the determined period based on at least one user input.

21. The system of any of claim 15 wherein the control subsystem causes the at least one illumination source to be turned ON in response to the sensed illumination level during the current one of the daily cycles being equal to or below a turn ON threshold.

22. The system of claim 21 wherein the control subsystem causes the at least one illumination source to be turned OFF in response to the sensed illumination level during the current one of the daily cycles being equal to or above a turn OFF threshold.

23. The system of claim 15 wherein the control subsystem further determines a period of time between when the at least one illuminate source is turned ON and turned OFF during at least one of the daily cycles; determines a middle of the determined period; calibrates a clock to the determined middle of the determined period; and determines when to cause the level of illumination produced by the at least one illumination source to be increased further based at least in part on the calibrated clock.

24. The system of claim 15 wherein during a training daily cycle the control subsystem determines an amount of time between sensing a level of illumination that is below a turn ON threshold and sensing a level of illumination that is above a turn OFF threshold; and stores information indicative of the determined amount of time in a processor-readable storage medium.

25. The system of claim 15 wherein the system is selectively detachable from a luminaire that includes dawn/dusk control mechanism and at least one light sensitive sensor.

26. The system of claim 15, further comprising:
at least one sensor that senses illumination in an environment, the at least one sensor communicatively coupled to the control subsystem.

* * * * *

UNITED STATES PATENT AND TRADEMARK OFFICE
CERTIFICATE OF CORRECTION

| | | |
|---|---|---|
| PATENT NO. | : 8,541,950 B2 | Page 1 of 1 |
| APPLICATION NO. | : 12/784091 | |
| DATED | : September 24, 2013 | |
| INVENTOR(S) | : William G. Reed | |

It is certified that error appears in the above-identified patent and that said Letters Patent is hereby corrected as shown below:

In the Claims

Column 26, Line 48:
"21. The system of any of claim 15 wherein the control" should read, --21. The system of claim 15 wherein the control--.

Signed and Sealed this
Twenty-sixth Day of August, 2014

Michelle K. Lee
*Deputy Director of the United States Patent and Trademark Office*